(12) United States Patent
Okada et al.

(10) Patent No.: US 8,482,774 B2
(45) Date of Patent: Jul. 9, 2013

(54) IMAGE FORMING APPARATUS DISPLAYING FUNCTION-RELATED INFORMATION

(75) Inventors: Mikiya Okada, Osaka (JP); Terumi Hayashi, Osaka (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 472 days.

(21) Appl. No.: 12/800,305

(22) Filed: May 12, 2010

(65) Prior Publication Data
US 2010/0290068 A1    Nov. 18, 2010

(30) Foreign Application Priority Data

May 18, 2009 (JP) ................................. 2009-119625

(51) Int. Cl.
*H04N 1/40* (2006.01)
(52) U.S. Cl.
USPC ......................................... 358/1.15; 358/400
(58) Field of Classification Search
USPC ................. 358/1.9, 2.1, 1.15–1.16, 500, 400, 358/442–444, 522–523, 468
See application file for complete search history.

(56) References Cited

U.S. PATENT DOCUMENTS

| | | | |
|---|---|---|---|
| 5,987,225 A | 11/1999 | Okano | |
| 7,221,885 B2 | 5/2007 | Sato | |
| 2002/0071689 A1 | 6/2002 | Miyamoto | |
| 2002/0144162 A1 | 10/2002 | Tada et al. | |
| 2006/0136488 A1 | 6/2006 | Mifune et al. | |
| 2006/0164669 A1 | 7/2006 | Itou | |
| 2007/0019229 A1 | 1/2007 | Matsuhara | |
| 2008/0199199 A1 | 8/2008 | Kato et al. | |
| 2008/0250494 A1 | 10/2008 | Nagata | |
| 2009/0077065 A1 | 3/2009 | Song et al. | |
| 2009/0195819 A1 | 8/2009 | Sugimoto et al. | |
| 2009/0310169 A1 | 12/2009 | Imaizumi et al. | |
| 2010/0005167 A1 | 1/2010 | Kishimoto | |
| 2010/0053692 A1 | 3/2010 | Machiyama | |
| 2010/0265547 A1 | 10/2010 | Katou et al. | |
| 2010/0290068 A1 | 11/2010 | Okada et al. | |
| 2010/0290071 A1 | 11/2010 | Okada et al. | |
| 2010/0290085 A1 | 11/2010 | Okada et al. | |

FOREIGN PATENT DOCUMENTS

| | | |
|---|---|---|
| CN | 1794104 A | 6/2006 |
| CN | 1811609 A | 8/2006 |
| JP | 7321984 A | 12/1995 |
| JP | 8-305516 A | 11/1996 |

(Continued)

*Primary Examiner* — Thomas D Lee
*Assistant Examiner* — Stephen M Brinich
(74) *Attorney, Agent, or Firm* — Edwards Wildman Palmer LLP; David G. Conlin; Edmund J. Koundakjian

(57) ABSTRACT

A CPU of an MFP executes a program including: a step of receiving combination information collecting combinations of functions set by a user from a server computer and storing the information in a function combination management table; a step of reading the function combination management table, when a user logged in to a certain MFP selects a function; a step of reading not-to-be-displayed recommended function for the user from a not-to-be-displayed function management table; a step of displaying a function or functions combined with high frequency with the established function and not set to be not-to-be-displayed, as recommendations on a touch panel display; and a step of storing, when a recommended menu setting button is pressed and a function set as not-to-be-displayed function is established, storing the selected function as the not-to-be-displayed recommended function, in the not-to-be-displayed function management table.

4 Claims, 17 Drawing Sheets

FOREIGN PATENT DOCUMENTS

| | | |
|---|---|---|
| JP | 10-079819 A | 3/1998 |
| JP | 2002-006696 A | 1/2002 |
| JP | 2002182529 A | 6/2002 |
| JP | 2002-300332 A | 10/2002 |
| JP | 2004074149 A | 3/2004 |
| JP | 2004-212539 A | 7/2004 |
| JP | 2004-234195 A | 8/2004 |
| JP | 2005-045370 A | 2/2005 |
| JP | 2005-297488 A | 10/2005 |
| JP | 2006229556 A | 8/2006 |
| JP | 2006-285968 A | 10/2006 |
| JP | 2007074149 A | 3/2007 |
| JP | 2007-086865 A | 4/2007 |
| JP | 2007-130981 A | 5/2007 |
| JP | 2008054242 A | 3/2008 |
| JP | 2008-147961 A | 6/2008 |
| JP | 2008-236028 A | 10/2008 |
| JP | 2008-246812 A | 10/2008 |
| JP | 2008-258893 A | 10/2008 |
| JP | 2009077335 A | 4/2009 |

FIG. 4

| USER ID | MACHINE ID | DATE & TIME OF USE | BASIC FUNCTION (MODE) | SET FUNCTION (1) | SET FUNCTION (2) | SET FUNCTION (3) | ... |
|---|---|---|---|---|---|---|---|
| 000001 | M001 | 2009/4/6 18:06:15 | COPY | 2in1/4in1 | DUPLEX | – | – |
| 000005 | M002 | 2009/4/7 09:15:45 | COPY | 2in1/4in1 | TRIAL COPY | – | – |
| | | | FAX/IMAGE TRANSMISSION | | | | |
| | | | DOCUMENT FILING | | | | |

FIG. 5

| SET FUNCTION | COMBINED FUNCTION | NUMBER OF COMBINATIONS MADE IN PAST 6 MONTHS | DISPLAY PRIORITY |
|---|---|---|---|
| 2in1／4in1 | DUPLEX | 50 | 1 |
| | TRIAL COPY | 45 | 2 |
| | DOCUMENT NUMBER COUNT | 21 | 3 |
| | ... | ... | ... |
| | ... | ... | ... |
| DUPLEX | 2in1／4in1 | 50 | 2 |
| | TRIAL COPY | 21 | 3 |
| | DOCUMENT NUMBER COUNT | 62 | 1 |
| | ... | ... | ... |
| | ... | ... | ... |
| | | | |
| | | | |

FIG. 7

| USER ID | NOT-TO-BE-DISPLAYED RECOMMENDED FUNCTION |
|---|---|
| 000001 | DUPLEX COPY |
| 000002 | 2in1／4in1 |
| 000003 | DOCUMENT NUMBER COUNT |
| | DUPLEX COPY |
| 000004 | TRIAL COPY |
| ... | |

FIG. 6

| USER ID | BASIC FUNCTION (MODE) | SET FUNCTION | NUMBER OF SETTINGS IN PAST 6 MONTHS | DISPLAY PRIORITY |
|---|---|---|---|---|
| 000001 | COPY | 2in1/4in1 | 21 | 2 |
| | | DUPLEX | 11 | 4 |
| | | TRIAL COPY | 23 | 1 |
| | | DOCUMENT NUMBER COUNT | 12 | 3 |
| | | FRAME ERASURE | 3 | 5 |
| | | ⋮ | ⋮ | ⋮ |
| | FAX/IMAGE TRANSMISSION | | | |
| | DOCUMENT FILING | | | |
| 000002 | | | | |
| 000003 | | | | |
| 000004 | | | | |
| 000005 | | | | |
| ⋮ | | | | |

IMAGE FORMING APPARATUS DISPLAYING FUNCTION-RELATED INFORMATION

CROSS-REFERENCE TO RELATED APPLICATION

This nonprovisional application claims priority under 35 U.S.C. §119(a) on Patent Application No. 2009-119625 filed in Japan on May 18, 2009, the entire contents of which are hereby incorporated by reference.

BACKGROUND OF THE INVENTION

1. Field of the Invention

The present invention relates to a technique of displaying an appropriate operation guide in accordance with a situation of use in an image forming apparatus having a number of functions, so as to allow a user to easily select a suitable function from among a large number of functions. More specifically, the present invention relates to a technique allowing a user to select even a combination not known to the user, when a plurality of functions are to be combined and used from among a large number of functions, without lowering operability for the user.

2. Description of the Background Art

It has become increasingly common to connect an image forming apparatus having a printer function or a copy function to a network, to allow use by a plurality of users. Further, the number of apparatuses having a plurality of functions (modes) such as a copy function, a facsimile function (hereinafter "facsimile" may also be denoted as FAX or fax), a network-supported printer function and a scanner function, such as multi-function peripherals, is increasing. In such a multi-function peripheral, each user selects a basic function (mode) and sets a function of duplex (two-sided) printing or collective printing (such as 2-in-1 by which two pages of an original document are printed on one sheet, or 4-in-1 by which four pages of an original document are printed on one sheet), whereby images are formed on sheets of paper in a desired manner. Appropriate combinations of these functions come to be more frequently used.

When a user uses such a multi-function peripheral (image forming apparatus), the user inputs image data using, for example, the scanner function, performs image processing (such as collection) by inputting various instructions through an operation panel, and prints the results using the printer function. Some apparatuses allow the user to confirm the result of processing, by providing a thumb-nail image or a preview image to ease user operation. Further, some apparatuses convert such a series of user operations to a macro command and automatically registers with a key, or display operation history as a menu, so as to allow the user to easily instruct the same process. Further, some apparatuses predict and present possible next operation command based on a comparison between operation history and recent operations or based on operation frequency, so as to eliminate the necessity to perform complicated menu selecting operation.

Japanese Patent Laying-Open No. 2008-236028 (Document 1) discloses an image forming apparatus in which an appropriate predicted menu in accordance with the situation of use of the image forming apparatus is displayed, so as to allow the user to easily instruct an image processing function that is often used. The image forming apparatus disclosed in Document 1 includes: a history management unit managing the operation history of the user; a function count management unit counting the state of use of processing functions in the operation history, and outputting a process count value; a prediction control unit predicting image processing operations with priority based on the process count value, and generating a prediction menu; an image working control unit forming an image of reduced size indicating expected result of processing of the object image based on the predicted image processing operation; a preview display control unit displaying the prediction menu including the image of expected result on an operation unit in accordance with the priority; and a process executing unit executing, in response to selection of one item of the prediction menu, the corresponding image processing.

In the image forming apparatus, the operation history of the user is managed; the state of use of process functions in the operation history is counted and the process count value is output; image processing operations are predicted with priority based on the process count value and a plurality of prediction menus are formed accordingly; an image reduced in size is formed representing the expected result of processing based on the predicted image processing operation; the prediction menu including the image of expected result is displayed on the operation unit in accordance with the priority, for every destination of output of the processed result; and in response to selection of one item of the prediction menu, the corresponding image processing is executed. Therefore, an appropriate prediction menu in accordance with the situation of use of the image forming apparatus is displayed, and the image processing function often used by the user can be used without necessitating complicated settings.

Japanese Patent Laying-Open No. 2005-297488 (Document 2) discloses an image forming apparatus allowing, even when a user uses an image forming apparatus that he/she has never operated in the past, the user to utilize operation history stored in another image forming apparatus of a similar type, if the user has an experience of using the image forming apparatus of the similar type that is communicable with the image forming apparatus to be used. The image forming apparatus disclosed in Document 2 includes: an operation history storing unit storing operation history based on operation instructions input through an input unit; a communication unit performing data communication with one or a plurality of other image forming apparatuses communicable through a prescribed network; operation history collecting unit collecting operation histories from the one or plurality of other image forming apparatuses using the communication unit; an operation history integrating unit integrating the operation history stored in the operation history storing unit and the operation history collected by the operation history collecting unit from the one or plurality of other image forming apparatuses; an operation history display unit controlling display on a display unit of the operation histories integrated by the operation history integrating unit; an operation history selecting unit selecting an arbitrary operation history from the operation histories displayed on the display unit; and a setting unit setting the image forming apparatus based on the operation history selected by the operation history selecting unit.

In the image forming apparatus, operation history based on operation instructions is stored in the storage unit; operation histories are collected from one or a plurality of other image forming apparatuses communicable through a prescribed communication medium; the operation history stored in the storage unit and the operation history or histories collected from the one or plurality of other image forming apparatuses are integrated; the integrated operation histories are displayed controlled on the display unit; an arbitrary operation history is selected from the displayed operation histories; and setting is done based on the selected operation history. Therefore, even when the user uses an image forming apparatus he/she has never operated before (no operation history is stored), it is possible to use operation history stored in another image forming apparatus of a similar type, if the user has operated the image forming apparatus of the similar type communicable to the image forming apparatus to be used (that is, operation history is stored in the image forming apparatus of the similar type). Therefore, even if the image forming apparatus is to be used for the first time, it is possible to reduce the trouble of setting each and every item from scratch. Thus, the conventional problem that all settings must be done from scratch when a new image forming apparatus is to be used as operation history of other image forming apparatus is unavailable, can be solved. The user can easily select and re-use desired operation history, and the operation history stored in each image forming apparatus can effectively be utilized, whereby operation efficiency and productivity can be improved.

SUMMARY OF THE INVENTION

Recent multi-function peripherals have a large number of different functions, to meet various and many demands of the users. When a user using such a multi-function peripheral repeatedly selects the same function, it is possible by the technique disclosed in Document 1 to reduce complicated operations, since the function to be selected next by the user is predicted with high accuracy and the prediction menu is displayed. According to the technique disclosed in Document 2, even when an image forming apparatus not operated in the past is to be used, it is possible to utilize operation history stored in an image forming apparatus of a similar type and to select the same function, if the image forming apparatus of the similar type has been operated in the past, so that operability can be improved.

If a multi-function peripheral has a huge number of functions, however, it is expected that each user uses combinations of only a very limited functions. For instance, though a skilled user may use a combination of appropriate functions to save energy, a beginner may not know and hence not use such a combination of functions. Particularly, when a multi-function peripheral is connected through a network and shared by various users, skills of users vary, and it is very likely that only some users having high degree of proficiency know combinations of functions that attain job-related high efficiency while other users are not aware of such combinations.

It is often the case that users belonging to the same department (group) form similar documents (prints on sheets of recording paper). Even in one same group, there are users who know combinations of functions that are highly efficient to the job of the group and users who do not know such combinations. In such a case, a user (particularly, a beginner) who does not know a combination of efficient functions will not know such a combination of functions, until he/she happens to find such a combination by himself/herself. Considering the large number of functions provided by recent multi-function peripherals, it would be difficult for a user to find an efficient combination of functions by himself/herself. Further, a user who knows such efficient combinations of functions often fail to notice presence of such novice users, unless he/she is a person who receives such documents, since it may be necessary to actually look at the output from the multi-function peripheral printed on the sheet of recording paper to notice the level of proficiency. It is not likely that when a person uses a multifunction peripheral, another person checks and confirms the output at the site. Therefore, it follows that a beginner selects functions of the multifunction peripheral not knowing the combinations of functions used by a skilled user, while a skilled user is unaware of such situation of beginners.

While there is such a problem, some users may consider it is unnecessary to know any combination of functions used by other user or users (no matter whether the user belongs to the same group or not, or no matter whether the user is a skilled user or not). By way of example, it is unlikely for a user who always copies a small number of documents to select the document number counting function, and it is unlikely for a user who has difficulty in reading small prints to select the collecting function. Therefore, when combinations of functions are uniformly notified to all users, operability to some users may become lower.

The present invention was made to solve the above-described problem, and its object is to provide an image forming apparatus displaying information related to a function that can be combined to another function, allowing, in the image forming apparatus having various and may functions in which the functions are appropriately combined and used, even a beginner to appropriately combine and use a number of functions, by appropriately presenting combinations of functions not known to the beginner but known by other user or users without lowering operability for the user.

According to the present invention, an image forming apparatus displays information related to a function combined with a function selected by a user from a plurality of functions of the image forming apparatus. The image forming apparatus includes: an obtaining unit obtaining use history information related to the function selected by the user; a use history storage unit storing the use history information; a collecting unit collecting combination information related to frequency of combination between one function and another function, based on the stored use history information; a combination information storage unit for storing the combination information; a first selecting unit allowing the user to select one function from a plurality of functions; a display unit displaying a function combined with high frequency with the selected function based on the combination information; a second selecting unit allowing a user to select a not-to-be-displayed function from functions displayed on the display unit; and a control unit controlling the display unit such that a function or functions combined with high frequency are displayed, excluding the not-to-be-displayed function.

According to another aspect, the image forming apparatus includes: an obtaining unit obtaining combination information, from an information processing apparatus obtaining use history information related to a function selected by the user and collecting combination information related to frequency of combination between one function and another function; a combination information storage unit for storing the combination information; a first selecting unit allowing the user to select one function from a plurality of functions; a display unit displaying a function combined with high frequency with the selected function based on the combination information; a second selecting unit allowing a user to select a not-to-be-displayed function from functions displayed on the display unit; and a control unit controlling the display unit such that a function or functions combined with high frequency are displayed, excluding the not-to-be-displayed function.

In the image forming apparatus, pieces of combination information based on use history information related to functions selected by many users are collected and obtained. The combination information represents information related to frequency of combination of one function and another function. Based on the combination information, the image forming apparatus displays a function or functions often used in combination with one function selected by the user. As a result, in an image forming apparatus having various and may functions in which the functions are appropriately combined and used, it becomes possible to appropriately present a combination or combinations of functions not known to the user himself/herself but known to other user or users. When a function or functions combined with high frequency to the selected one function are displayed, a not-to-be-displayed function selected not to be displayed is excluded from the display. There may be a function or functions not used by some users. Therefore, by not displaying such function, operability for the user is not lowered. Thus, even a beginner can appropriately combine and use many functions.

The display unit may be configured to display functions that are combined with high frequency in order, starting from a function of the highest frequency.

It is possible for a user to easily know a function used in combination by many users, even if he/she does not know the function, in relation to a function selected by the user himself/herself.

According to the image forming apparatus in accordance with the present invention, in an image forming apparatus having various and may functions in which the functions are appropriately combined and used, it becomes possible to appropriately present a combination or combinations of functions not known to the user himself/herself but known to other user or users. Particularly, it is possible not to display a function the user never selects, even if that function is used in combination by other users. Thus, a user can appropriately combine and use many functions, while operability for the user is not lowered.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 shows a use history management table stored in the server computer of FIG. 1.

FIG. 5 shows a function combination management table stored in the server computer of FIG. 1.

FIG. 6 shows a user-by-user use history management table stored in the server computer of FIG. 1.

FIG. 7 shows a user-by-user not-to-be-displayed function management table stored in the server computer of FIG. 1.

DESCRIPTION OF THE PREFERRED EMBODIMENTS

Figure 1:
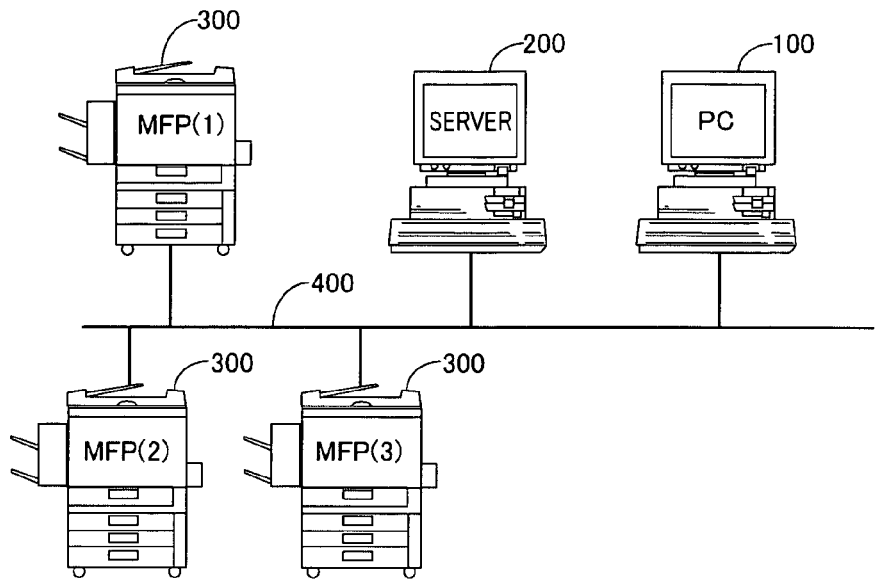
FIG. 1 shows an overall configuration of a network image forming system including an information processing apparatus (server computer) and an image forming apparatus (MFP) in accordance with an embodiment of the present invention.

In the following description, the same components are denoted by the same reference characters. Their functions and names are also the same. Therefore, detailed description thereof will not be repeated. In the following description, it is assumed that the image forming apparatus for forming an image on a sheet of recording paper is an MFP (Multifunction Peripheral). The present invention, however, is applicable to any apparatus having at least the printing function and in which various and many functions are combined and used, and application is not limited to an MFP.

Further, in the following description, it is assumed that the information processing apparatus processing information related to the function to be combined with selected one function is a server computer. The information processing apparatus, however, may be included in the MFP. Further, though a network image forming system including a plurality of MFPs is described, the network image forming system may be formed simply by one MFP including the information processing apparatus mentioned above.

[Overall System Configuration]

Referring to FIG. 1, an overall configuration of the network image forming system in accordance with the first embodiment of the present invention will be described. The network image forming system includes: a personal computer (PC) 100; MFP(1) 300 to MFP(3) 300 (hereinafter MFP(1) 300 to MFP (3) 300 may be generally referred to as MFP 300) receiving a copy request or a print request and printing an image on a sheet of recording paper; and a server computer 200 processing use history of users of the plurality of MFPs 300. Client computer 100, server computer 200 and MFP 300 are connected to be communicable to each other by a network line 400 in accordance with, for example, IEEE802.3. Though MFP(1) 300 to MFP(3) 300 are denoted by the same reference characters, they are not necessarily MFPs having the same functions.

In the present embodiment, server computer 200 stores use history of a user in MFP 300 received through network line 400, together with a user ID for uniquely identifying the user, in a use history management table. Server computer 200 collects functions used in MFP 300 user by user based on the use history of each user, and stores the results in user-by-user use history management table. Server computer 200 transmits the user-by-user use history information to MFP 300 through network line 400. Based on the user-by-user use history information received from server computer 200, MFP 300 displays a function used with high frequency by a logged-in user on a touch-panel display.

Further, based on the use histories of many users, server computer 200 collects function combination information of functions used in combination in MFP 300, and stores the results in function combination management table. Server computer 200 transmits the combination information to MFP 300 through network line 400. Based on the combination information received from server computer 200, MFP 300 displays a function often combined with the function selected by the user on the touch-panel display.

Server computer 200 further manages such that even a function often combined with the function selected by the user is not displayed as a recommended function on the touch-panel display, if it is a function requested by the user not to be displayed on the touch-panel display. If a plurality of MFPs are connected to the network image forming system, a function registered as a not-to-be-displayed function by a user on any of the MFPs is not displayed in any other MFP for the user.

In this manner, in the present embodiment, the function often used by the user logged-in to use the MFP and the function often combined with the function selected by the user are displayed on the touch-panel. A function requested not to be displayed by the user is not displayed on the touch-panel display, even if the function is often combined.

In the following, in the specification and drawings, server computer 200 may be simply referred to as a server, and MFP 300 may be simply referred to as an MFP.

[Hardware Configuration]

<Server Computer 200>

Figure 2:
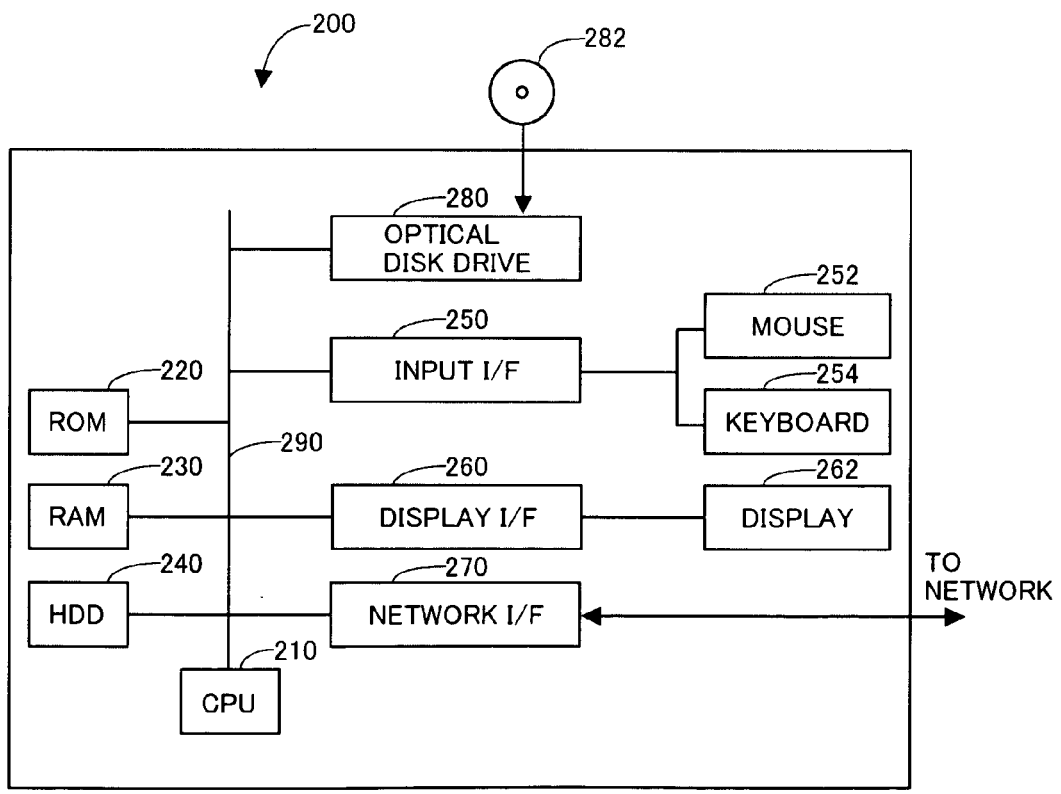
FIG. 2 is a control block diagram showing hardware configuration of the server computer shown in FIG. 1.

Referring to FIG. 2, server computer 200 forming the network image forming system in accordance with the present embodiment includes: a bus 290; a CPU (Central Processing Unit) 210 connected to bus 290; an ROM (Read Only Memory) 220 connected to bus 290; an RAM (Random Access Memory) 230 connected to bus 290; a hard disk (HDD) 240 connected to bus 290; an optical disk drive 280, connected to bus 290, on which an optical disk 282 is mountable, and capable of writing of information to optical disk 282 and reading of information from optical disk 282; an input interface (hereinafter referred to as "input I/F") 250, connected to bus 290, for providing an interface for connection between a mouse 252 and a keyboard 254; a display interface (hereinafter referred to as a "display I/F") 260, connected to bus 290, for providing an interface related to connection with a display 262; and a network interface (hereinafter referred to as a "network I/F") 270 providing wired or wireless (in the present embodiment, wired) connection to network line 400. Server computer 200 may include a magnetic disk drive on which a magnetic disk is mountable, and capable of writing of information to the magnetic disk and reading of information from the magnetic disk, in place of/in addition to optical disk drive 280.

Bus 290, ROM 220, RAM 230, hard disk 240, optical disk drive 280, input I/F 250, display I/F 260 and network I/F 270 all operate in cooperation with each other under the control of CPU 210, and as the server computer in accordance with the present invention, server computer 200 realizes processes of various applications. Such applications realize a server computer of a network image forming system for appropriately presenting a combination of functions often used, for example, in MFP 300.

The computer program or programs causing server computer 200 to operate as the server computer of the network image forming system in accordance with the present embodiment are stored in optical disk 282 to be inserted to optical disk drive 280, and transferred to hard disk 240. Alternatively, the programs may be transmitted through network line 400 to server computer 200 and stored in hard disk 240. At the time of execution, the programs are loaded to RAM 230. The programs may be directly loaded to RAM 230 from optical disk 282 or through network line 400.

These programs include a plurality of instructions causing server computer 200 to operate as the server computer in the network image forming system in accordance with the present embodiment. Some of the basic functions necessary to realize these operations are provided by an operating system (OS) operating on server computer 200 or a third-party program, or a module of various tool kits installed in server computer 200. Therefore, the program may not necessarily include all functions required to realize the method and system in accordance with the present embodiment. The program may include only the instructions executing a prescribed process as server computer 200 described above, by calling appropriate functions or "tools" in a controlled manner to attain the desired results. General operations of a computer as the substance of server computer 200 are well known and, therefore, description will not be given here.

Personal computer 100 also has a configuration similar to that of server computer 200 described above. In personal computer 100, a printer driver, for example, is installed. Document data formed by an application such as a word processor is transmitted through the printer driver to MFP 300.

<MFP 300>

Figure 3:
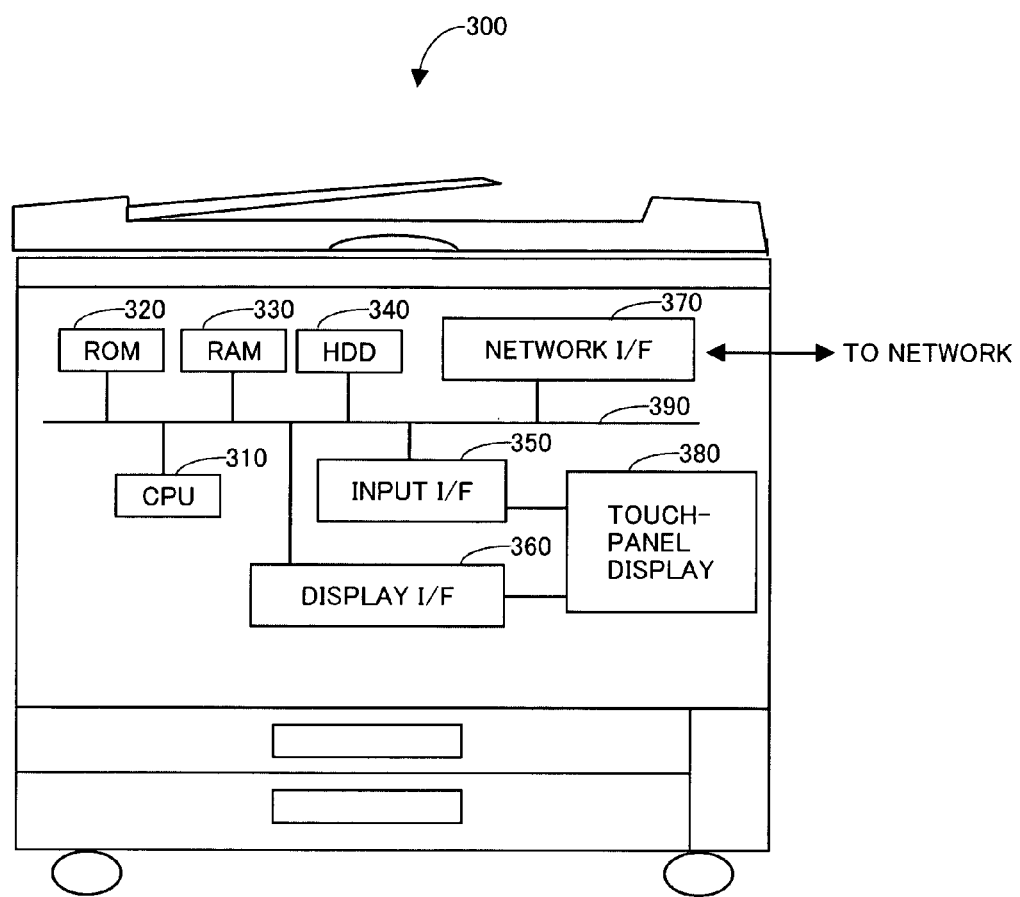
FIG. 3 is a control block diagram showing hardware configuration of the MFP shown in FIG. 1.

Referring to FIG. 3, MFP 300 forming the network image forming system in accordance with the present embodiment includes: a bus 390; a CPU 310 connected to bus 390; an ROM 320 connected to bus 390; an RAM 330 connected to bus 390; an HDD 340 connected to bus 390; an input I/F 350 and a display I/F 360, connected to bus 390, for providing interface related to connection with touch-panel display 380; and a network I/F 370 providing wired or wireless (in the present embodiment, wired) connection to network line 400. Though not shown in FIG. 3, MFP 300 includes hardware buttons such as a start button and ten-key buttons. Further, MFP 300 has a function of allowing a user to log-in, to use MFP 300. By way of example, it includes an input unit receiving an input of a user number (such as a company member number) as a user ID, and a determining unit determining whether the input number is a user number registered in advance. The input unit may be a fingerprint input unit and the determining unit may be a fingerprint recognizing unit. Any biometric information other than the fingerprint may be used.

Bus 390, ROM 320, RAM 330, hard disk 340, input I/F 350, display I/F 360 and network I/F 370 all operate in cooperation with each other under the control of CPU 310, and realize the printing process, FAX transmission/reception process, scanner process and copy process in MFP 300. These processes are executed by various components forming MFP 300, not shown in FIG. 3, under the control of CPU 310.

MFP 300 includes, for example, a document reading unit, an image forming unit, a paper feed unit, and a paper discharge unit. In MFP 300, on image data of an original document read by the document reading unit, various image processing operations are done by CPU 310, and the resulting image data is output to the image forming unit. MFP 300 includes a so-called laser type (electrophotographic type) printing function, in which a laser beam is used for exposure. It may have a different type printing function.

The image forming unit is for printing an image represented by the image data on a sheet of recording paper, and it includes, by way of example, a photoreceptor drum, a charger, a laser scanning unit, a developer, a transfer device, a cleaning device, a fixing device and a neutralizer. In the image forming unit, a feeding path, for example, is formed, and a sheet of recording paper fed from the paper feed unit is fed along the feeding path. The paper feed unit draws out sheets of recording paper stacked on a paper feed cassette or on a manual feed tray one by one, and feeds the sheet of paper to the feeding path of the image forming unit.

While the sheet of recording paper is fed along the feeding path of image forming unit, the sheet passes between the photoreceptor drum and the transfer device, and further passes through the fixing device, whereby printing is done on the sheet of recording paper.

The photoreceptor drum rotates in one direction, and its surface is cleaned by the cleaning device and the neutralizer and, thereafter, uniformly charged by the charger. The laser scanning unit modulates the laser beam based on the image data to be printed, and repeatedly scans the surface of photoreceptor drum with the laser beam in a main scanning direction, whereby an electrostatic latent image is formed on the surface of photoreceptor drum. The developer develops the electrostatic latent image by supplying toner to the surface of photoreceptor drum, and thus, a toner image is formed on the surface of photoreceptor drum.

The transfer device transfers the toner image on the surface of photoreceptor drum to the sheet of recording paper passing between the transfer device and the photoreceptor drum. The fixing device includes a heating roller for heating the sheet of recording paper and the pressure roller for pressing the sheet of recording paper. As the sheet of recording paper is heated by the heating roller and pressed by the pressure roller, the toner image that has been transferred to the sheet of recording paper is fixed on the sheet. The sheet of recording paper discharged from the fixing device (printed paper) is discharged to the discharge tray. The paper discharging device may perform a process of sorting a plurality of printed sheets of paper to be output to different discharge trays, a process of punching each sheet of recording paper or a process of stapling the sheets of recording paper. Assume that a number of copies of the printing are to be prepared. In that case, sheets of recording paper are sorted and discharged to paper discharge trays such that each tray contains each set of printed sheets, and the set of printed sheets in each tray is stapled or punched, whereby copies of prints are prepared. Such processes are performed under the control of CPU 310. Punching process may be done on each sheet of the printing paper.

[Management Table Configuration]

Referring to FIG. 4, the use history management table stored in HDD 240 of server computer 200 will be described. The use history management table stores use history representing which function or a combination of which functions is utilized by the user in MFP 300, based on the use history information transmitted from MFP 300. If functions are not combined, only the selected one function is stored as the use history.

As shown in FIG. 4, the use history table consists of: a field for storing user ID for uniquely identifying a user; a field for storing machine ID for uniquely identifying MFP 300; a field for storing information related to date and time of use; a field for storing basic function used (copy mode, fax/image transmission mode, document filing mode and the like); and fields for storing set function (1), set function (2), set function (3) . . . used in combination. The set functions may be stored assuming that the user set the functions time-sequentially in the order of set function (1), set function (2), set function (3) . . . , or the function or functions may be stored in accordance with a predetermined priority.

Referring to FIG. 5, a function combination management table stored in HDD 240 of server computer 200 will be described. The function combination management table stores, based on the use history information stored in the use history table shown in FIG. 4, the number of combinations of functions combined to a set function, and display priority that corresponds to the number of combinations in descending order.

As shown in FIG. 5, the function combination management table consists of: a field for storing the set function (corresponding to set function (1) of FIG. 4); a field for storing a function (corresponding to set function (2) or set function (3) of FIG. 4) combined with the set function; a field for storing the number of combinations representing how many times the function has been combined in the past six months; and a field for storing the display priority based on the number of combinations.

In FIG. 5, a combination of set function (1) (for example, 2-in-1/4-in-1) and set function (2) (for example, duplex) is also a combination of set function (1) (for example, duplex) and set function (2) (for example, 2-in-1/4-in-1). Therefore, if these functions are combined, the number of combinations is counted twice. If three functions are combined, three combinations, that is, the combination of set functions (1) and (2), the combination of set functions (1) and (3), and the combination of set functions (2) and (3) are counted.

Though the period for collecting the number of combinations is set to past six months in the example of FIG. 5, the present invention is not limited to the above. The period may be shorter or longer, or the period may be set by a user (in this case, the user may include an administrator).

Referring to FIG. 6, a user-by-user use history management table stored in HDD 240 of server computer 200 will be described. In the user-by-user use history management table, use history representing which user used which function in MFP 300 is collected user by user, based on the use history information transmitted from MFP 300.

As shown in FIG. 6, the user-by-user use history management table consists of a field for storing user ID for uniquely identifying a user; a field for storing basic function used (copy mode, fax/image transmission mode, document filing mode and the like); a field for storing the set function used with the basic function; a field for storing the number of settings representing how many times the function is set in the past six months; and a field for storing display priority based on the number of settings.

Referring to FIG. 7, a user-by-user not-to-be-displayed function management table stored in HDD 240 of server computer 200 and in HDD 340 of MFP 300 will be described. The user-by-user not-to-be-displayed function management table consists of: a field for storing user ID for uniquely identifying a user; and a field for storing not-to-be-displayed recommended function. The not-to-be-displayed recommended function is a function that is not displayed on touch-panel display 380, even if it is a function often combined with the function selected by the user.

The not-to-be-displayed function management table is stored in HDD 240 of server computer 200 and in HDD 340 of MFP 300. If a request is made by a user in MFP 300 not to display a function even if it is a recommended function, the not-to-be-displayed function management table in MFP 300 is updated. Based on the not-to-be-displayed function management table, MFP 300 transmits the not-to-be-displayed recommended function information (recommended function not-to-be-displayed) together with the user ID, to server computer 200. Based on the not-to-be-displayed recommended function information received from a plurality of MFPs 300, server computer 200 updates the not-to-be-displayed function management table stored in server computer 200. Based on the updated not-to-be-displayed function management table, server computer 200 transmits the not-to-be-displayed recommended function information (recommended function not-to-be-displayed) together with the user ID, to each MFP 300. Based on the not-to-be-displayed recommended function information received from server computer 200, each MFP 300 updates the not-to-be-displayed function management table stored in MFP 300.

As shown in FIG. 7, by way of example, for the user identified by the user ID "000003", the "document number count" function and "duplex copy" function are not displayed on touch-panel display 380, even if these functions are often used in combination with a function selected by this user.

[Software Configuration]

Figure 8:
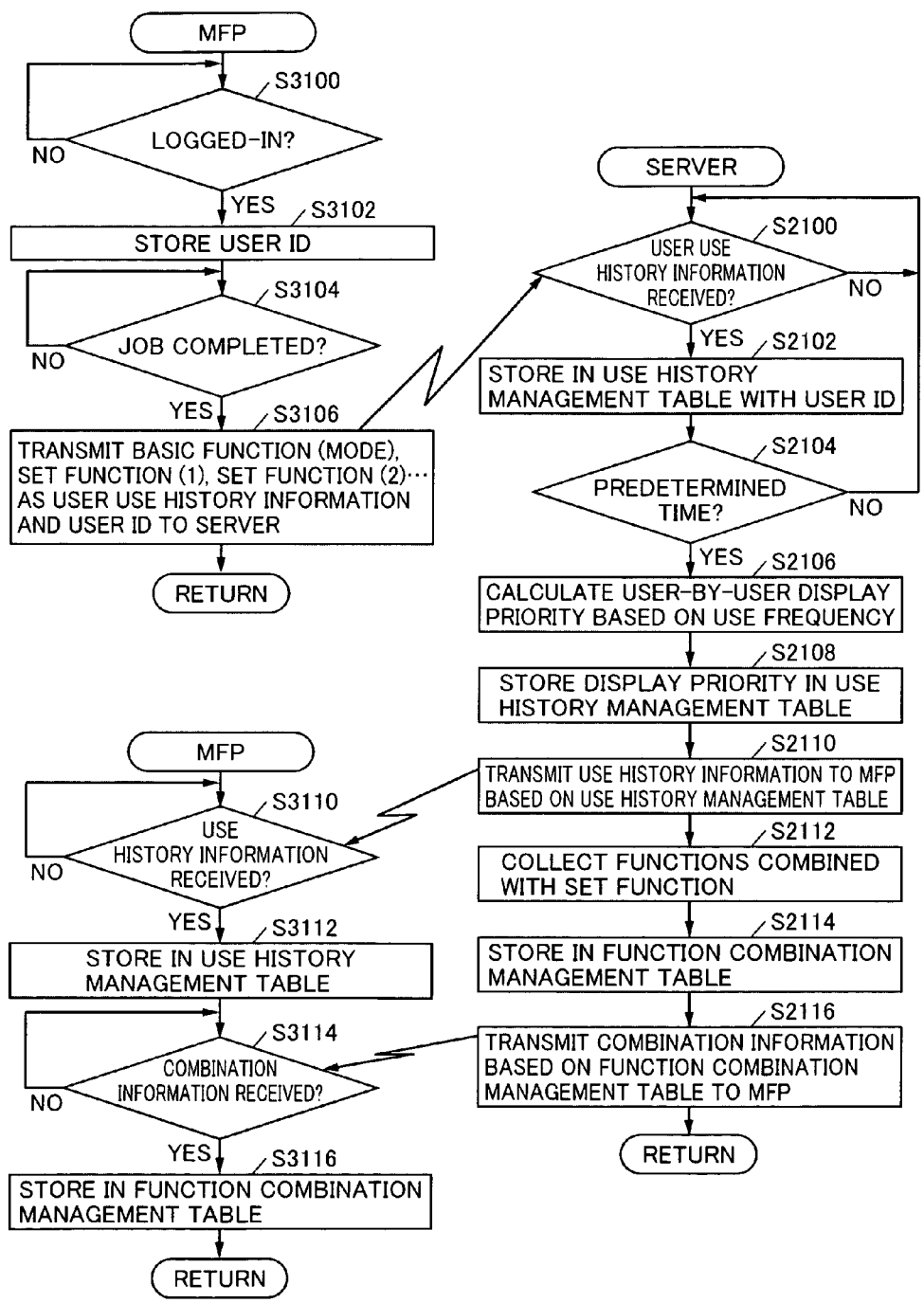
FIG. 8 is a flowchart representing a control structure of a use history processing program executed in the server computer and the MFP of FIG. 1, respectively.

Referring to FIG. 8, a control structure of a computer program executed by server computer 200 and MFP 300 to realize the user use history processing in the network image forming system in accordance with the present embodiment will be described.

The program shown on the upper left side of FIG. 8 is executed by CPU 310 of MFP 300. At step (hereinafter, "step" will be denoted by "S") 3100, CPU 310 of MFP 300 (hereinafter simply referred to as CPU 310) determines whether or not a user of MFP 300 has requested log-in and successfully logged-in. At this time, CPU 310 displays a user number input image or a fingerprint input image on touch-panel display 380, and when a user number is input or a fingerprint of the user is input, it determines that the user who is going to use MFP 300 has logged-in. If the user who is to log-in is determined to be a user registered in advance based on the user number or the user fingerprint, CPU 310 permits log-in. If CPU 310 permits log-in, a determination of successful log-in is made. If it is determined that the user of MFP 300 has successfully logged-in (YES at S3100), the process proceeds to S3102. Otherwise (NO at S3100), the process returns to S3100, and waits until it is determined that a user of MFP 300 has logged-in.

At S3102, CPU 310 stores a user ID for uniquely identifying a user, registered in correspondence with the input user number or the fingerprint of the user.

At S3104, CPU 310 determines whether or not a job in MFP 300 is completed. Here, if the requested process ends successfully, CPU 310 determines that the job in MFP 300 is completed. If it is determined that the job in MFP 300 is completed (YES at S3104), the process proceeds to S3106. Otherwise (NO at S3104), the process returns to S3104, and waits until it is determined that the job in MFP 300 is completed.

At S3106, CPU 310 transmits, together with the user ID, the basic function (mode), set function (1), set function (2) . . . , of the job that is determined to be completed, as user use history information, to server computer 200.

The program shown on the right side of FIG. 8 is executed by CPU 210 of server computer 200. At S2100, CPU 210 of server computer 200 (hereinafter simply referred to as CPU 210) determines whether or not the user use history information is received from MFP 300. At this time, determination is made for a plurality of MFPs 300. If it is determined that the user use history information is received from MFP 300 (YES at S2100), the process proceeds to S2102. Otherwise (NO at S2100), the process returns to S2100, and waits until it is determined that the user use history information is received from MFP 300.

At S2102, CPU 210 stores the user use history information received from MFP 300 in use history management table shown in FIG. 4, with user ID. Pieces of user use history information are received from a plurality of MFPs 300 and stored in the use history management table, whereby many pieces of use history information come to be stored together with the user IDs, in use history management table. In FIG. 4, pieces of information of which date and time of use is older than six months are erased, or not reflected on the collection of combined functions.

At S2104, CPU 210 determines whether a predetermined time is reached. The predetermined time corresponds to a time interval for collecting the combined functions. If it is determined that the predetermined time (for example, time corresponding to the time interval of 12 hours) is reached (YES at S2104), the process proceeds to S2106. Otherwise (NO at S2104), the process returns to S2100. The process flows in this manner since collecting the combined functions may be done with appropriate time interval, while updating of use history management table is done on real time basis upon reception of the use history information from a plurality of MFPs 300.

At S2106, CPU 210 calculates the display priority based on the frequency of use of MFP 300 user by user, based on the use history information stored in the use history management table. At S2108, CPU 210 stores the calculated display priority in the user-by-user use history management table shown in FIG. 6.

At S2110, CPU 210 transmits the user-by-user use history information (set function, used function and display priority) to MFP 300, based on the user-by-user use history management table. In order to reduce communication traffic, transmission of user-by-user use history information to MFP 300 may be transmission of only the portions that changed after the last transmission, as difference data. Further, the time interval for updating the function combination management table and the time interval for transmitting the user-by-user use history information to MFP 300 may be different from each other.

At S2112, CPU 210 collects the functions combined with the set function, based on the use history information stored in the use history management table. At S2114, CPU 210 stores the results of collection in the function combination management table shown in FIG. 5. Thus, the function combination management table is updated at a constant time interval.

At S2116, CPU 210 transmits the combination information (set function, combined function and display priority) to MFP 300, based on the function combination management table. In order to reduce communication traffic, transmission of combination information to MFP 300 may be transmission of only the portions that changed after the last transmission, as difference data. Further, the time interval for updating the function combination management table and the time interval for transmitting to MFP 300 may be different from each other.

The program shown on the lower left side of FIG. 8 is executed by CPU 310 of MFP 300. At S3110, CPU 310 determines whether or not the user-by-user use history information is received from server computer 200. If it is determined that the user-by-user use history information is received from server computer 200 (YES at S3110), the process proceeds to S3112. Otherwise (NO at S3110), the process returns to S3110, and waits until it is determined that the user-by-user use history information is received from server computer 200.

At S3112, CPU 310 stores the user-by-user use history information received from server computer 200 in the user-by-user use history management table. At this time, CPU 310 stores a management table in which the set number field for the past six months removed from the user-by-user use history management table shown in FIG. 6 as the user-by-user use history management table, in HDD 340. Thus, it is possible in each of the plurality of MFPs 300 to store user by user the functions often combined in MFP 300 connected to the network line 400.

At S3114, CPU 310 determines whether or not the combination information is received from the server computer 200. If it is determined that the combination information is received from server computer 200 (YES at S3114), the process proceeds to S3116. Otherwise (NO at S3114), the process returns to S3114, and waits until it is determined that the combination information is received from server computer 200.

At S3116, CPU 310 stores the combination information received from server computer 200 in the function combination management table. At this time, CPU 310 stores a management table in which the combination number field for the past six months removed from the function combination management table shown in FIG. 5 as the function combination management table, in HDD 340. Thus, it is possible in each of the plurality of MFPs 300 to store user by user the functions often combined in MFP 300 connected to the network line 400.

Figure 9:
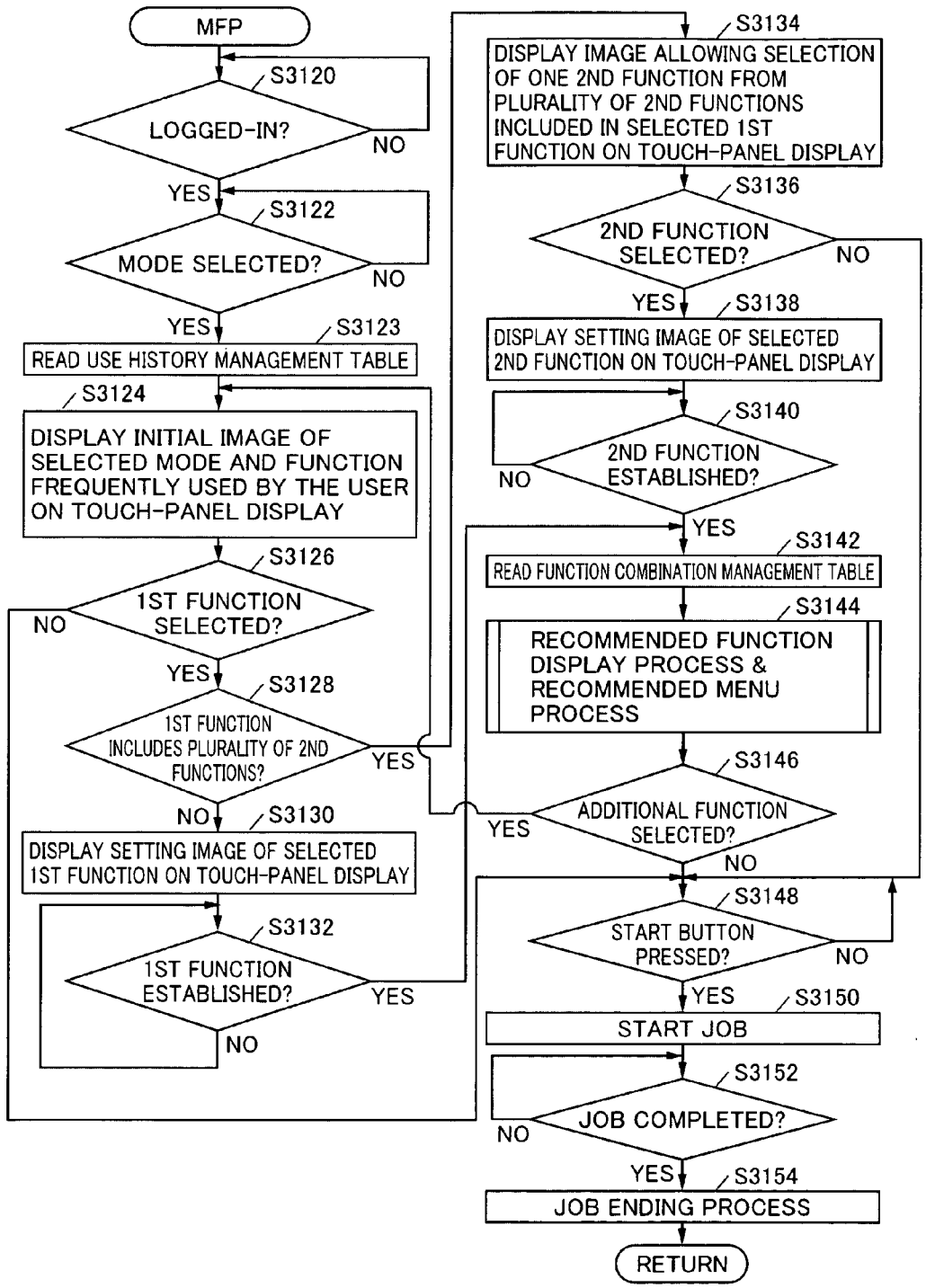
FIG. 9 is a flowchart representing a control structure of a function setting program executed by the MFP of FIG. 1.

Referring to FIG. 9, a control structure of a computer program executed by MFP 300 for allowing a user to set a function in the network image forming system in accordance with the present embodiment will be described.

At S3120, CPU 310 of MFP 300 determines whether or not a user of MFP 300 has requested log-in and successfully logged-in. At this time, CPU 310 displays a user number input image or a fingerprint input image on touch-panel display 380, and when a user number is input or a fingerprint of the user is input, it determines that the user who is going to use MFP 300 has logged-in. If the user who is to log-in is determined to be a user registered in advance based on the user number or the user fingerprint, CPU 310 permits log-in. If CPU 310 permits log-in, a determination of successful log-in is made. If it is determined that the user of MFP 300 has successfully logged-in (YES at S3120), the process proceeds to S3122. Otherwise (NO at S3120), the process returns to S3120, and waits until it is determined that a user of MFP 300 has logged-in. The process is the same as that of S3100 described above.

At S3122, CPU 310 determines whether or not mode selection is done. This MFP 300 has three modes, that is, "copy mode", "fax/image transmission mode" and "document filing mode." By way of example, when any of software buttons corresponding to the three modes displayed at the top of touch-panel display 380 is pressed, CPU 310 determines that the user has made mode selection. If it is determined that the user has made mode selection (YES at S3122), the process proceeds to S3123. Otherwise (NO at S3122), the process returns to S3122, and waits until it is determined that the user has made mode selection.

At S3123, CPU 310 reads the user-by-user use history management table (the management table of FIG. 6 with the set number field of past six months removed) from HDD 340.

At S3124, CPU 310 displays an initial image of the selected mode and a function that is used with high frequency by the user, on touch-panel display 380. At this time, CPU 310 displays the function that is used with high frequency by the user, on touch-panel display 380 based on the user-by-user use history management table. The number of functions displayed here is not specifically limited. Not only one but two or more functions may be displayed. It is also possible that a management table including the field of set numbers of past six months is used as the user-by-user use history management table stored in HDD 340 of MFP 300, and (any number of) functions of which number of settings in the past six months exceeds a threshold value (for example, 20 times) may be displayed. On the initial image of the copy mode, "color mode", "copy density", "magnification", "document direction" and "paper size & direction" are displayed, together with software buttons for changing such settings. Among software buttons for selecting functions, there is a button for selecting functions such as "duplex copy" and "finishing" (hereinafter referred to as "first function") and a button for selecting a "special function" (also referred to as the "first function"). If the "special function" is selected, it is possible to additionally select a function or functions such as "2-in-1/4-in-1", "margin" and "frame erasure" (hereinafter referred to as "second function"). Specifically, the first function refers to functions displayed on the initial image of each mode, including functions that can be selected by simply selecting the first function, and a function of selecting the second function. No matter whether "2-in-1/4-in-1" as the "special function" is selected first and then "duplex copy" is selected or "duplex copy" is selected first and then "2-in-1/4-in-1" as the "special function" is selected, it is considered that the function of "duplex copy" and the function of "2-in-1/4-in-1" are combined. It is noted that the present invention is not limited to such a menu hierarchy.

At S3126, CPU 310 determines whether or not the user has selected the first function. If it is determined that the user has selected the first function (YES at S3126), the process proceeds to S3128. Otherwise (NO at S3126), the process proceeds to S3148.

At S3128, CPU 310 determines whether or not the first function selected by the user includes a plurality of second functions. If the first function includes a plurality of second functions (YES at S3128), the process proceeds to S3134. Otherwise (NO at S3128), the process proceeds to S3130.

At S3130, CPU 310 displays a setting image for the first function selected by the user, on touch-panel display 380. At S3132, CPU 310 determines whether or not the first function has been established. Here, by way of example, if a prescribed item is set on the setting image of the first function (for example, "duplex copy") displayed on the touch-panel display and thereafter an "OK" button is pressed, CPU 310 determines that the first function is established. If it is determined that the first function is established (YES at S3132), the process proceeds to S3142. Otherwise (NO at S3132), the process returns to S3132 to wait until the first function is established.

At S3134, CPU 310 displays an image allowing selection of one second function among a plurality of second functions included in the selected first function, on touch-panel display 380. At S3136, CPU 310 determines whether the user has selected the second function. If it is determined that the user has selected the second function (YES at S3136), the process proceeds to S3138. Otherwise (NO at S3136), the process proceeds to S3148.

At S3138, CPU 310 displays a setting image for the second function selected by the user on touch-panel display 380. At S3140, CPU 310 determines whether or not the second function is established. Here, by way of example, if a prescribed item is set on the setting image of the second function (for example, "2-in-1/4-in-1") displayed on the touch-panel display and thereafter an "OK" button is pressed, CPU 310 determines that the second function is established. If it is determined that the second function is established (YES at S3140), the process proceeds to S3142. Otherwise (NO at S3140), the process returns to S3140 to wait until the second function is established.

At S3142, CPU 310 reads the function combination table (the management table of FIG. 5 with the combination number field of the past six months removed) from HDD 340. At S3144, CPU 310 performs the recommended function display process and a recommended menu process. Here, three functions are displayed as recommended functions for the established first function or the established second function (except for any function set not to be displayed), and a recommended menu setting button is displayed. Details of the process will be described later as a sub-routine. The number of recommended functions displayed at this time is not limited to three, and larger number of recommended functions may be displayed. If many functions are set not to be displayed, smaller number of functions may be displayed. It is also possible that a management table including the field of combination number of past six months is used as the function combination management table stored in HDD 340 of MFP 300, and (any number of) functions of which number of combinations in the past six months exceeds a threshold value (for example, 20 times) may be displayed (except for functions set not to be displayed).

At S3146, CPU 310 determines whether or not the user further selects an additional function. At this time, since the first function or the second function has been established (YES at S3132 or YES at S3140), it means that an additional function is further combined therewith. Here, by way of example, if a software button on touch-panel display 380 corresponding to a function displayed as a recommendation is pressed, CPU 310 determines that an additional function is selected. If it is determined that an additional function is selected (YES at S3146), the process returns to S3124. Otherwise (NO at S3146), the process proceeds to S3148. If it is determined that an additional function is selected (YES at S3146), the process may proceed to S3124, S3130 or S3138, in accordance with the selected function.

At S3148, CPU 310 determines whether or not the start button is pressed. If it is determined that the start button is pressed (YES at S3148), the process proceeds to S3150. Otherwise (NO at S3148), the process returns to S3148. If it is not determined that the start button is pressed (NO at S3148), the process may proceed to S3124.

At S3150, CPU 310 starts a job in accordance with the set function or functions. At this time, by way of example, image data of an original document read by the document reading unit is output to the image forming unit, and at the image forming unit the image represented by the image is printed on a sheet of recording paper, in MFP 300.

At S3152, CPU 310 determines whether the job is completed. If it is determined that the job in MFP 300 is completed (YES at S3152), the process proceeds to S3154. Otherwise (NO at S3152), the process returns to S3152 and waits until it is determined that the job in MFP 300 is completed.

At S3154, CPU 310 performs an ending process for the job that is determined to be completed. An example of the ending process includes transmission of basic function (mode), set function (1), set function (2) . . . as the use history information to server computer 200, of S3102 shown in FIG. 7. The ending process may be a different process, such as an accounting process.

Figure 10:
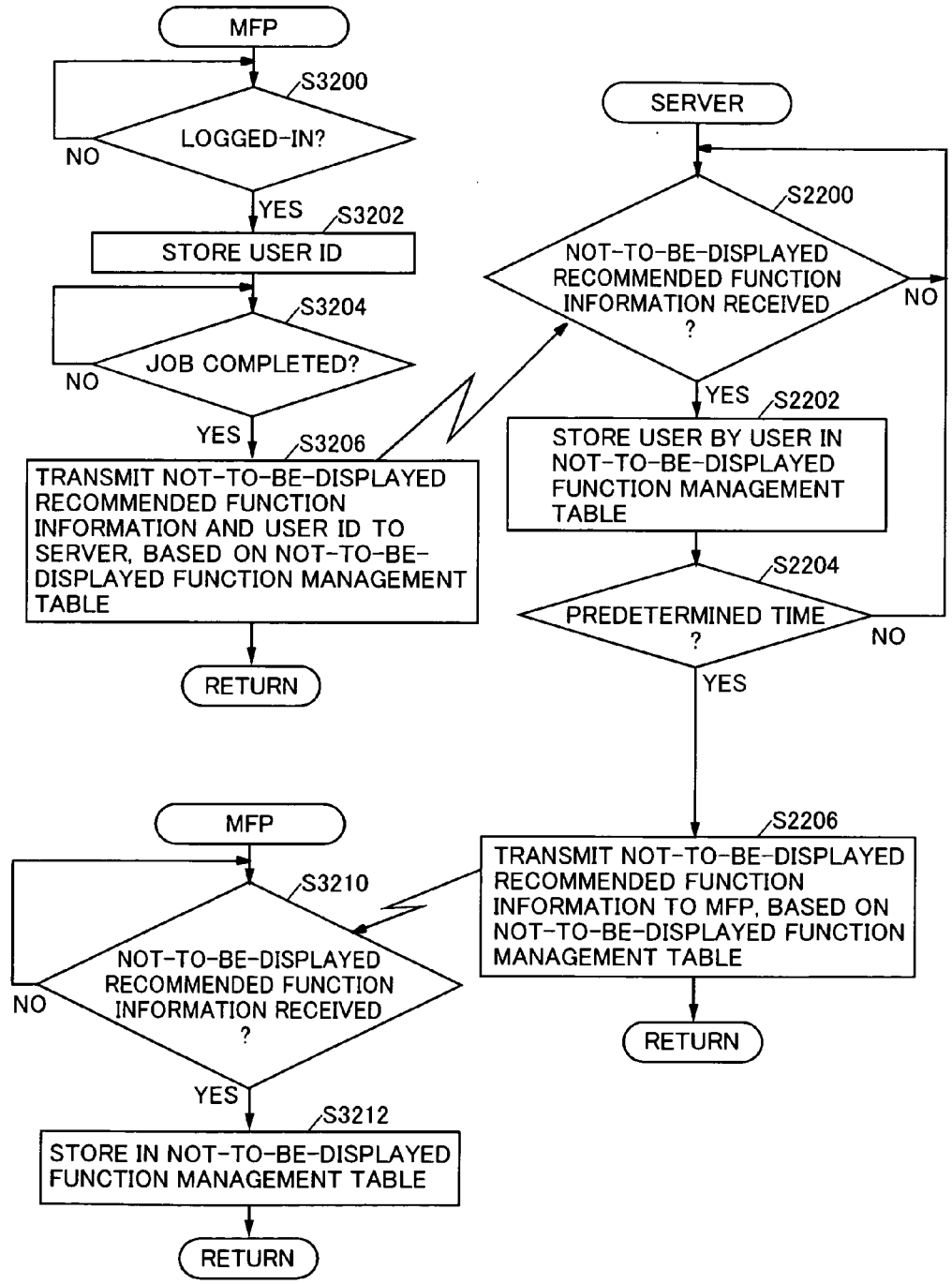
FIG. 10 is a flowchart representing a control structure of a not-to-display processing program for the recommended function executed by the server computer and MFP of FIG. 1, respectively.

Referring to FIG. 10, the control structure of a computer program executed by server computer 200 and MFP 300 to realize the process not to display a recommended function in the network image forming system in accordance with the present embodiment will be described.

The program shown on the upper left portion of FIG. 10 is executed by CPU 310 of MFP 300. At S3200, CPU 310 determines whether or not a user of MFP 300 has requested log-in and successfully logged-in. This process is the same as S3100. If it is determined that the user of MFP 300 is logged-in (YES at S3200), the process proceeds to S3202. Otherwise (NO at S3200), the process returns to S3200, and waits until it is determined that a user of MFP 300 is logged-in.

At S3202, CPU 310 stores a user ID for uniquely identifying a user, registered in correspondence with the input user number or the fingerprint of the user. This process is the same as S3102.

At S3204, CPU 310 determines whether or not a job in MFP 300 is completed. This process is the same as S3104. If it is determined that the job in MFP 300 is completed (YES at S3204), the process proceeds to S3206. Otherwise (NO at S3204), the process returns to S3204, and waits until it is determined that the job in MFP 300 is completed.

At S3206, since it is possible that a request not to display a recommended function has been input by the user for the job that is determined to be completed, CPU 310 transmits the not-to-be-displayed recommended function information and user ID to server computer 200, based on the not-to-be-displayed function management table.

The program shown on the right side of FIG. 10 is executed by CPU 210 of server computer 200. At S2200, CPU 210 determines whether or not the not-to-be-displayed recommended function information is received from MFP300. At this time, determination is made for a plurality of MFPs 300. If it is determined that the not-to-be-displayed recommended function information is received from MFP300 (YES at S2200), the process proceeds to S2202. Otherwise (NO at S2202), the process returns to S2200, and waits until it is determined that the not-to-be-displayed recommended function information is received from MFP300.

At S2202, CPU 210 stores the not-to-be-displayed recommended function information received from MFP 300 in not-to-be-displayed function management table shown in FIG. 7, with user ID. Pieces of not-to-be-displayed recommended function information are received from a plurality of MFPs 300 and stored in the not-to-be-displayed function management table, whereby many pieces of not-to-be-displayed recommended function information come to be stored together with the user IDs, in the not-to-be-displayed function management table.

At S2204, CPU 210 determines whether a predetermined time is reached. The predetermined time corresponds to a time interval for transmitting the not-to-be-displayed recommended function information to each MFP 300 based on the not-to-be-displayed function management table in server computer 200. If it is determined that the predetermined time (for example, time corresponding to the time interval of 1 hour) is reached (YES at S2204), the process proceeds to S2206. Otherwise (NO at S2204), the process returns to S2200. The process flows in this manner since reflection of recommended function not-to-be-displayed to each MFP may be done with appropriate time interval, unless one same user continuously uses different MFPs 300, while updating of not-to-be-displayed function management table is done on real time basis upon reception of the not-to-be-displayed recommended function information from a plurality of MFPs 300.

At S2206, CPU 210 transmits the user-by-user not-to-be-displayed recommended function information (recommended function not to be displayed) to MFP 300, based on the not-to-be-displayed function management table. In order to reduce communication traffic, transmission of the user-by-user not-to-be-displayed recommended function information to MFP 300 may be transmission of only the portions that changed after the last transmission, as difference data.

The program shown on the lower left portion of FIG. 10 is executed by CPU 310 of MFP 300. At S3210, CPU 310 determines whether or not the user-by-user not-to-be-displayed recommended function information is received from server computer 200. If it is determined that the user-by-user not-to-be-displayed recommended function information is received from server computer 200 (YES at S3210), the process proceeds to S3212. Otherwise (NO at S3120), the process returns to S3210, and waits until it is determined that the user-by-user not-to-be-displayed recommended function information is received from server computer 200.

At S3212, CPU 310 stores the user-by-user not-to-be-displayed recommended function information received from server computer 200 in the user-by-user not-to-be-displayed function management table. At this time, CPU 310 updates the not-to-be-displayed function management table (FIG. 7) stored in HDD 340. Thus, in each of the plurality of MFPs 300, it becomes possible to store, user by user, the function requested not to be displayed by the user in any of the MFPs 300 connected to network line 400.

Figure 11:
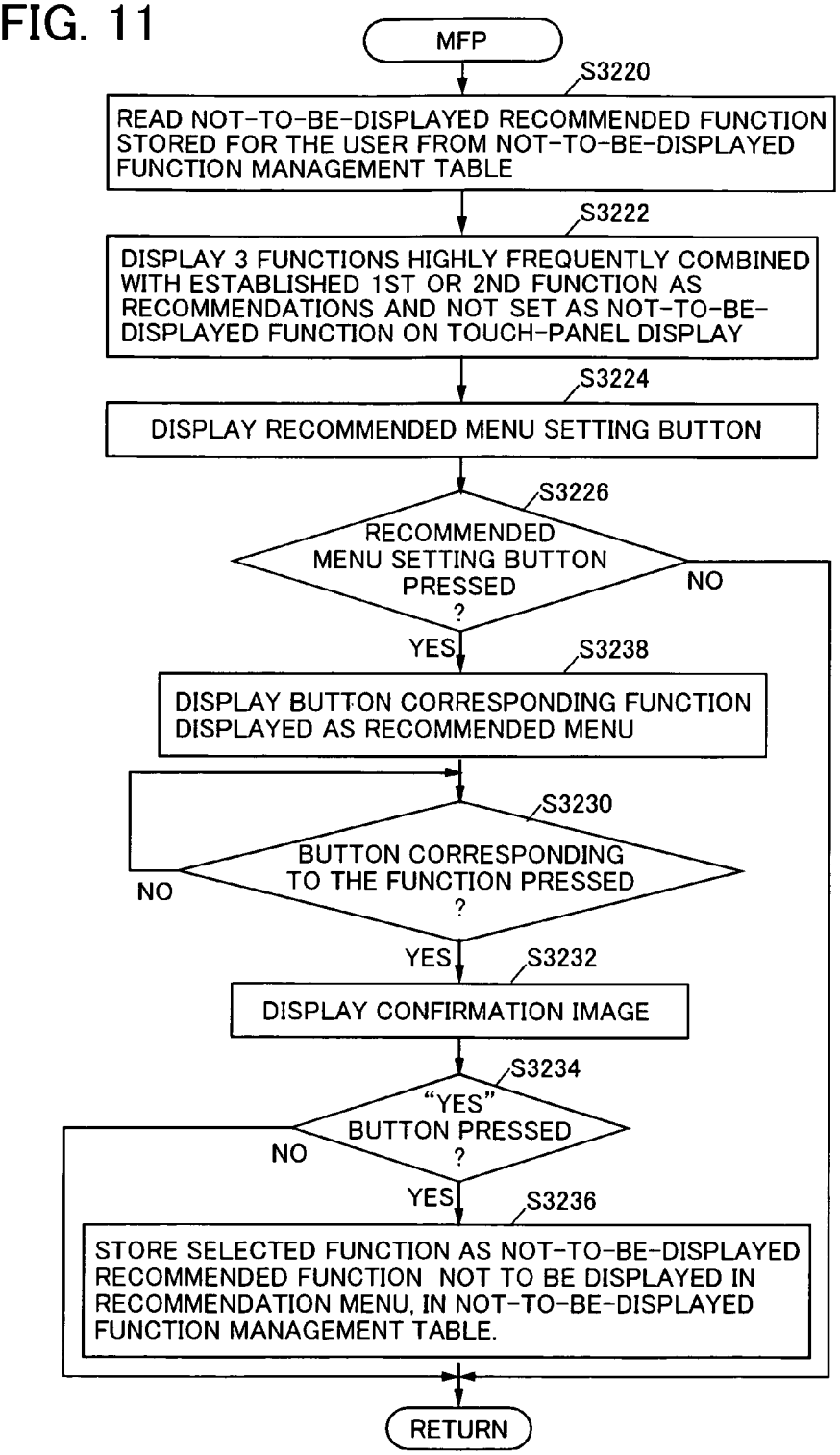
FIG. 11 is a flowchart representing a control structure of a recommended menu setting program executed by the MFP of FIG. 1.

Referring to FIG. 11, a control structure of a computer program executed by MFP 300 for realizing the recommended function display process and a recommended menu process in the network image forming system in accordance with the present embodiment will be described.

At S3220, CPU 310 reads a not-to-be-displayed recommended function (a function set by the user not to be displayed as a recommended function) stored for the logged-in user, from the not-to-be-displayed function management table.

At S3222, CPU 310 displays, as a recommended function, a function combined with high frequency with the established first function or the established second function which is not the function set not to be displayed, on touch-panel display 380. At S3224, CPU 310 displays a recommended menu setting button (software button) on touch-panel display 380.

At S3226, CPU 310 determines whether or not the recommended menu setting button displayed as a software button on touch-panel display 380 is pressed. If it is determined that the recommended menu setting button is pressed (YES at S3226), the process proceeds to S3228. Otherwise (NO at S3226), the sub-routine process ends.

At S3228, CPU 310 displays a software button corresponding to the function set as the recommended menu (the function combined with high frequency with the established first function or the established second function). At S3230, CPU 310 determines whether or not the software button corresponding to the function is pressed. If it is determined that the software button corresponding to the function is pressed (YES at S3230), the process proceeds to S3232. Otherwise (NO at S3230), the process returns to S3230. If it is not determined that the software button corresponding to the function is pressed after a prescribed time period from S3238, the sub-routine may be terminated.

At S3232, CPU 310 displays a confirmation image. Here, on touch-panel display 380, a software button of "YES" corresponding to positive confirmation and a software button of "NO" corresponding to negative confirmation are displayed. At S3234, CPU 310 determines whether or not the software button of "YES" is pressed. If it is determined that the software button of "YES" is pressed (YES at S3234), the process proceeds to S3236. Otherwise, that is, if the software button of "NO" is pressed (NO at S3234), the sub-routine ends. If neither the software button of "YES" nor the software button of "NO" is determined to be pressed after a prescribed time period from S3232, the sub-routine may be terminated.

At S3236, CPU 310 stores the selected function as a not-to-be-displayed recommended function not to be displayed on the recommendation menu, in the not-to-be-displayed function management table. Then, the sub-routine ends.

[Operation]

The operation of network image forming system in accordance with the present embodiment based on the structures and flowcharts as above will be described in the following.

<Use History Processing Operation>

Using the use history management table shown in FIG. 4, the function combination management table shown in FIG. 5, the user-by-user use history management table shown in FIG. 6 and the flowchart of FIG. 8, the use history processing operation of the network image forming system will be described.

First, the user requests log-in, by inputting a user number or by scan-inputting the fingerprint of the user, on touch-panel display 380 of MFP 300 to be used. If the user who requested log-in is a user registered in advance to allow use of MFP 300 (YES at S3100), the user ID is stored in MFP 300 (S3102), and the user can be uniquely identified.

When the user selects a desired function (for example, copy function) and performs a job (for example, a collective duplex copying) and the job is completed (YES at S3104) in MFP 300, the basic function (mode) and set function (1), set function (2), . . . selected by the user for the job in MFP 300 are transmitted as the user use history information, together with the user ID, to server computer 200 (S3106).

In response to such an operation of MFP 300, server computer 200 receives the user use history information from MFP 300 (YES at S2100). The received user use history information is stored, together with the user ID, in HDD 240, in the form of the use history management table shown in FIG. 4 (S2102).

When a predetermined time for collecting the user-by-user use history is reached (YES at S2104), based on the use history information stored in the use history management table, the display priority based on the frequency of use of MFP 300 is calculated user by user (S2106). The calculated display priority is stored in the user-by-user use history management table shown in FIG. 6 (S2108). Based on the user-by-user use history management table, the user-by-user use history information (set function, used function and the display priority) is transmitted to MFP 300 (S2110).

When a predetermined time for collecting the functions combined is reached (YES at S2104), based on the use history information stored in the use history management table, the functions combined with the set function are collected (S2112). The collected results are stored in the function combination management table shown in FIG. 5 (S2114). Based on the function combination management table, the combination information (set function, combined function and display priority) is transmitted to MFP 300 (S2116).

In response to such an operation of server computer 200, each of the plurality of MFPs 300 receives the user-by-user use history information from server computer 200 (YES at S3110). The received user-by-user use history information is stored in the form of the user-by-user use history management table (the user-by-user use history management table shown in FIG. 6 with the set number field of the past six months removed), in HDD 340 (S3112).

Further, each of the MFPs 300 receives the combination information from server computer 200 (YES at S3114). The received combination information is stored in the form of the function combination management table (the function combination management table of FIG. 5 with the field of combination number of the past six months removed) in HDD 340 (S3116).

In server computer 200, pieces of use history information from the plurality of MFPs 300 are received and the use history management table (FIG. 4) is updated on real time basis and the use history of each user is accumulated in the use history management table. While the use history of each user is accumulated in the use history management table, the user-by-user use history and the combined functions are collected at a preset time interval. Here, based on the use history information stored in the use history management table, the function set by the user and the functions combined with the set function are collected, and the user-by-user use history management table and the function combination management table are updated at a constant time interval. The user-by-user use history information and the combination information reflecting the updated function combination management table are transmitted to the plurality of MFPs 300.

<Function Setting Operation>

Using the flowchart of FIG. 9, image transition figures of touch-panel display 380 shown in FIGS. 12 to 15, the flowchart of FIG. 11 and image transition figures of touch-panel display 380 shown in FIGS. 16 to 19, the function setting operation of the network image forming system will be described.

Figure 12:
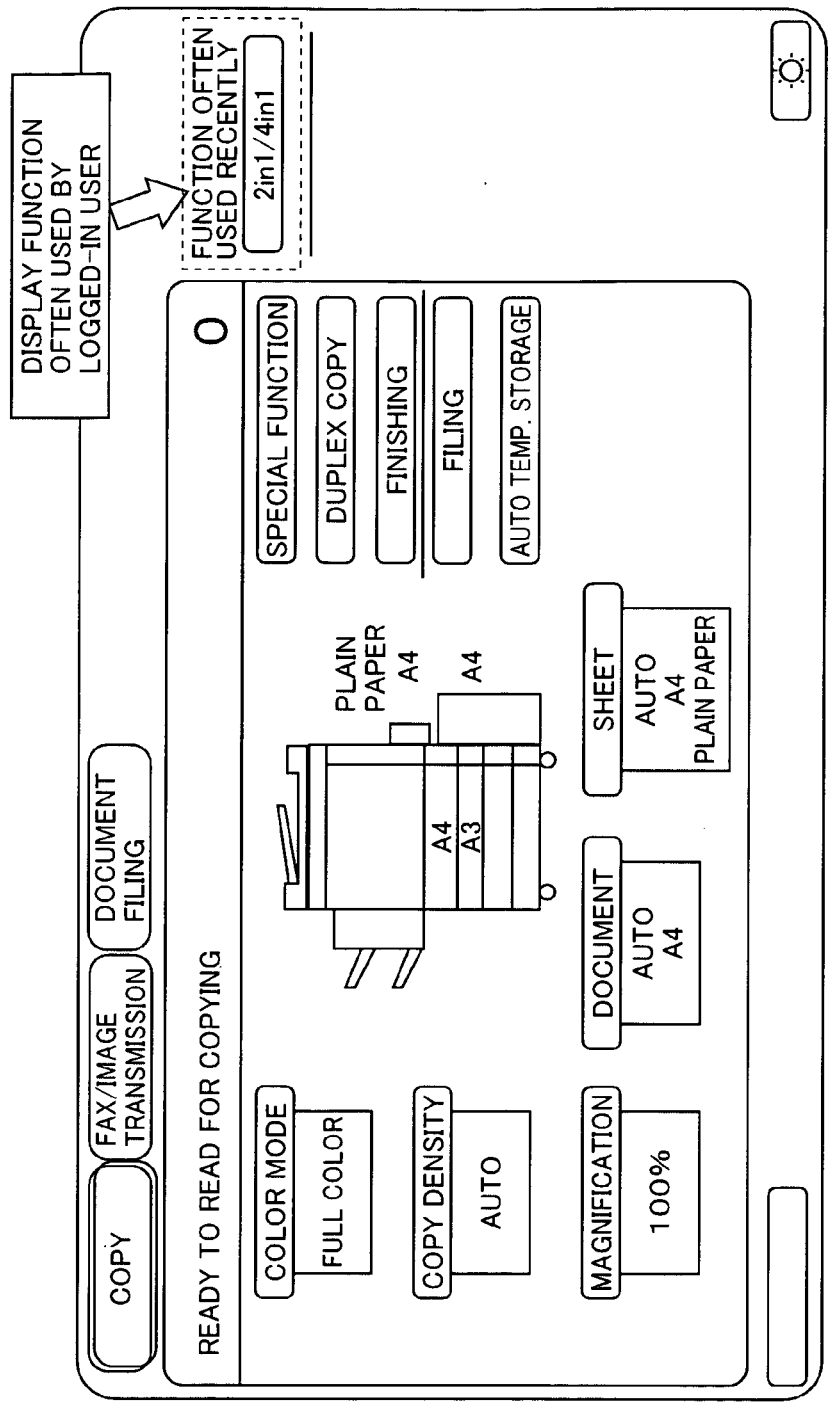
FIGS. 12 to 15 are transition diagrams showing exemplary displays on a touch-panel display when the program of FIG. 9 is executed.

When the user logs-in to an MFP 300 to be used (YES at S3120) and selects a desired mode (YES at S3122), the user-by-user use history management table (the management table of FIG. 6 with the set number field of past six months removed) is read (S3123), the initial image of the selected mode is displayed on touch-panel display 380, and the function used with high frequency by the logged-in user is displayed (S3124). FIG. 12 shows an exemplary initial image of the copy mode displayed on touch-panel display 380, when the "copy" mode button on the top left part of touch-panel display 380 is pressed. In FIG. 12, "2-in-1/4-in-1" (collective) is displayed as a function often used recently (past six months) by the logged-in user. Though only one function often used recently (past six months) by the logged-in user is displayed in FIG. 12, two or more functions may be displayed as described above.

Figure 13:
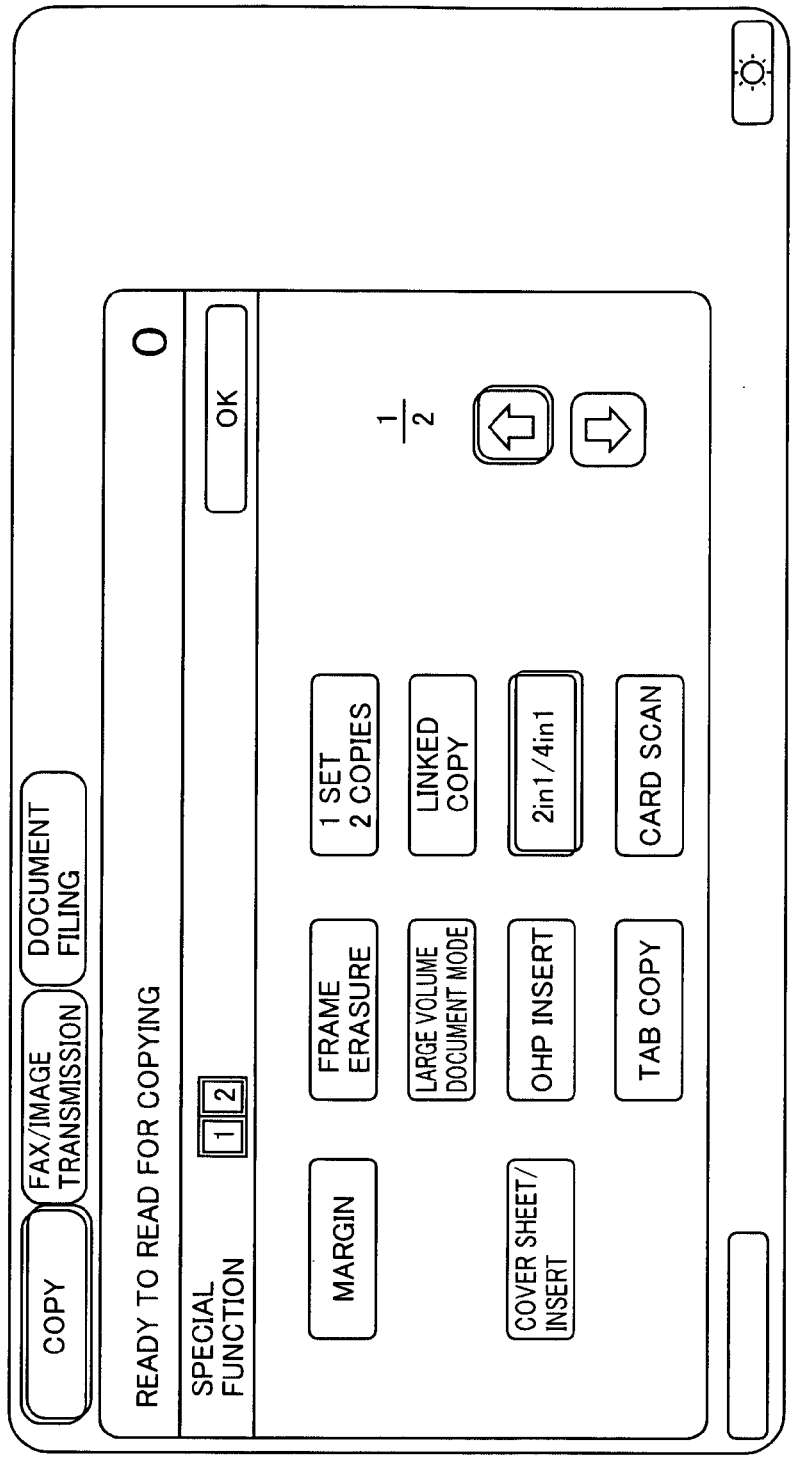

In FIG. 12, if the user presses the "special function" button (YES at S3126), since the special function includes a plurality of functions (YES at S3128), an image allowing selection of one second function among the plurality of second functions included in the selected special function (first function) is displayed on touch-panel display 380 (S3134). FIG. 13 shows an exemplary image of the special function menu, displayed on touch-panel display 380 after the "special function" button is pressed in FIG. 12.

Figure 14:
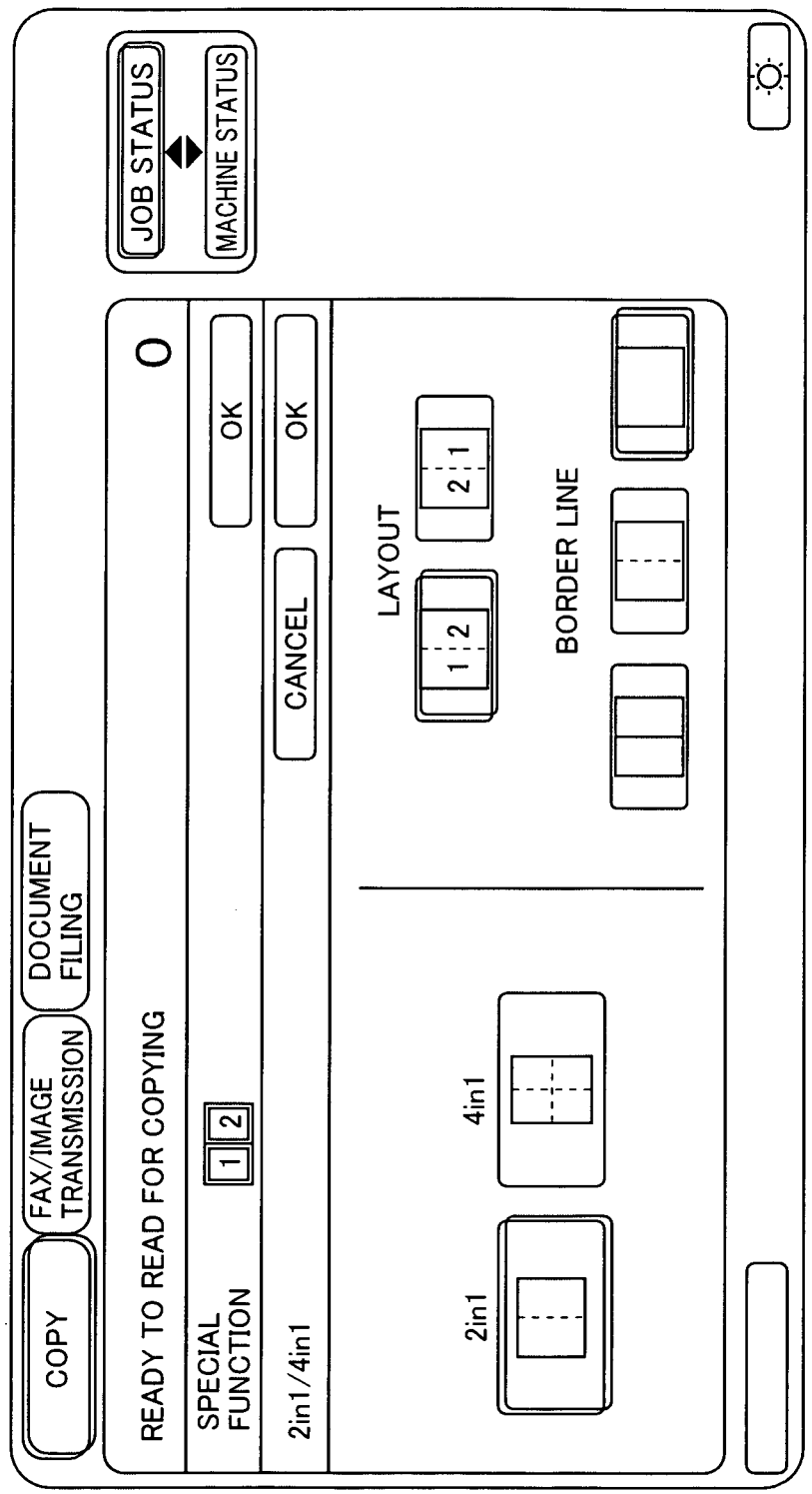

In FIG. 13, when the user presses the "2-in-1/4-in-1" button (YES at S3136), the setting image for the selected second function is displayed on touch-panel display 380 (S3138). FIG. 14 is an exemplary image of "2-in-1/4-in-1" setting menu displayed on touch-panel display 380 after the "2-in-1/4-in-1" button is pressed in FIG. 13.

Figure 15:
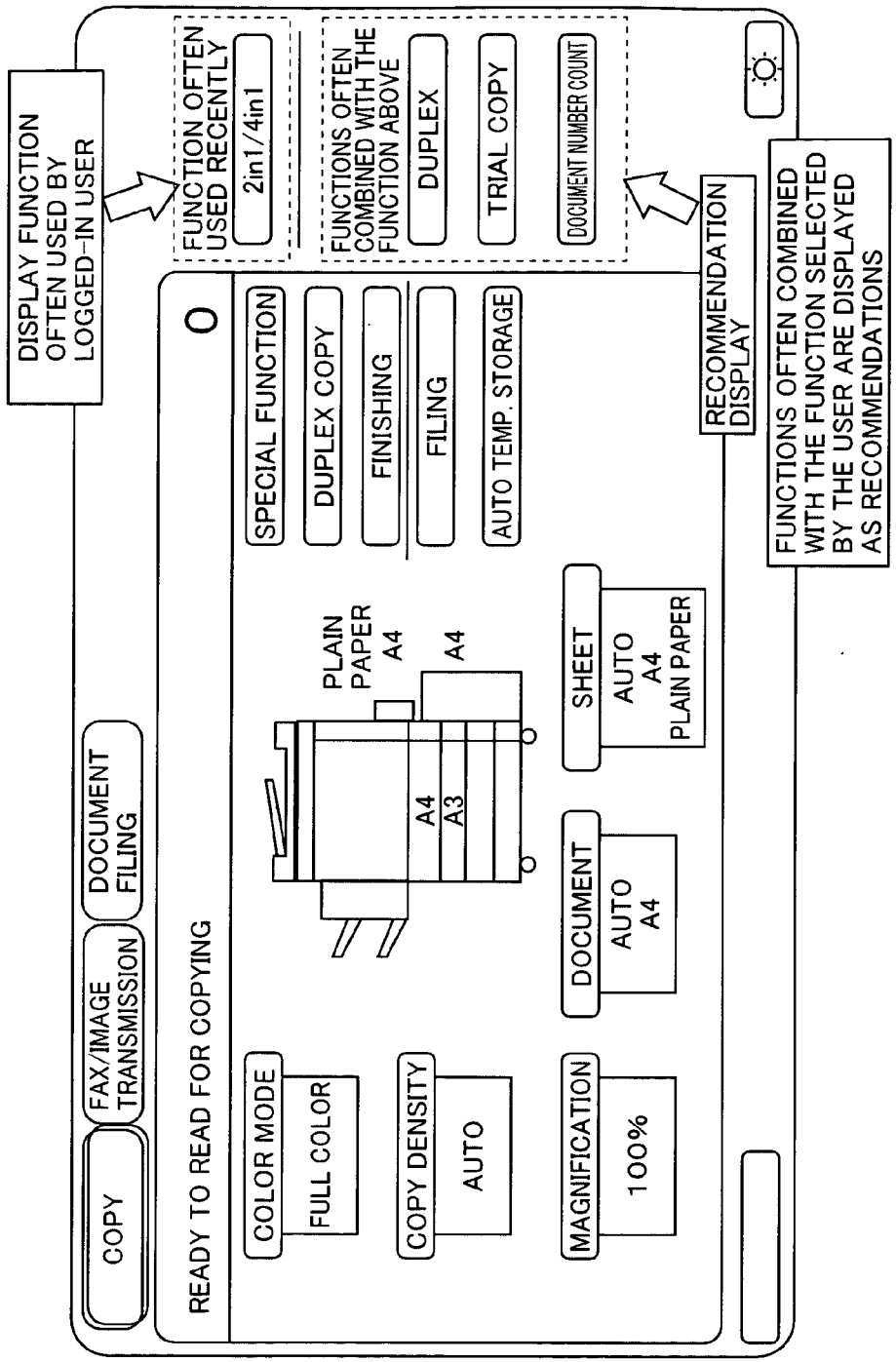

In FIG. 14, when the user presses a setting button for a detailed item (2-page collection or 4-page collection, layout, border line) related to the "2-in-1/4-in-1" and presses "OK" button for "2-in-1/4-in-1", the second function is established (YES at S3140). When "2-in-1/4-in-1" as the second function is established, the function combination management table is read (S3142), and three functions of higher priority that are highly frequently combined with the established "2-in-1/4-in-1" function are displayed as recommended functions, as shown in FIG. 15. In FIG. 15, three functions often combined recently (in the past six months) with the function selected by the logged-in user are displayed, though the display is not limited to such three functions. Here, as shown in FIG. 15, the display returns to the special function menu, an image allowing selection of one function from a plurality of functions included in the special function is displayed on touch-panel display 380, and "duplex copy", "trial copy" and "count document number" that are often combined with the "2-in-1/4-in-1" function established to be selected are displayed (S3144). Here, it is assumed that the three functions "duplex copy", "trial copy" and "count document number" are not set as the not-to-be-displayed functions by the user.

Figure 16:
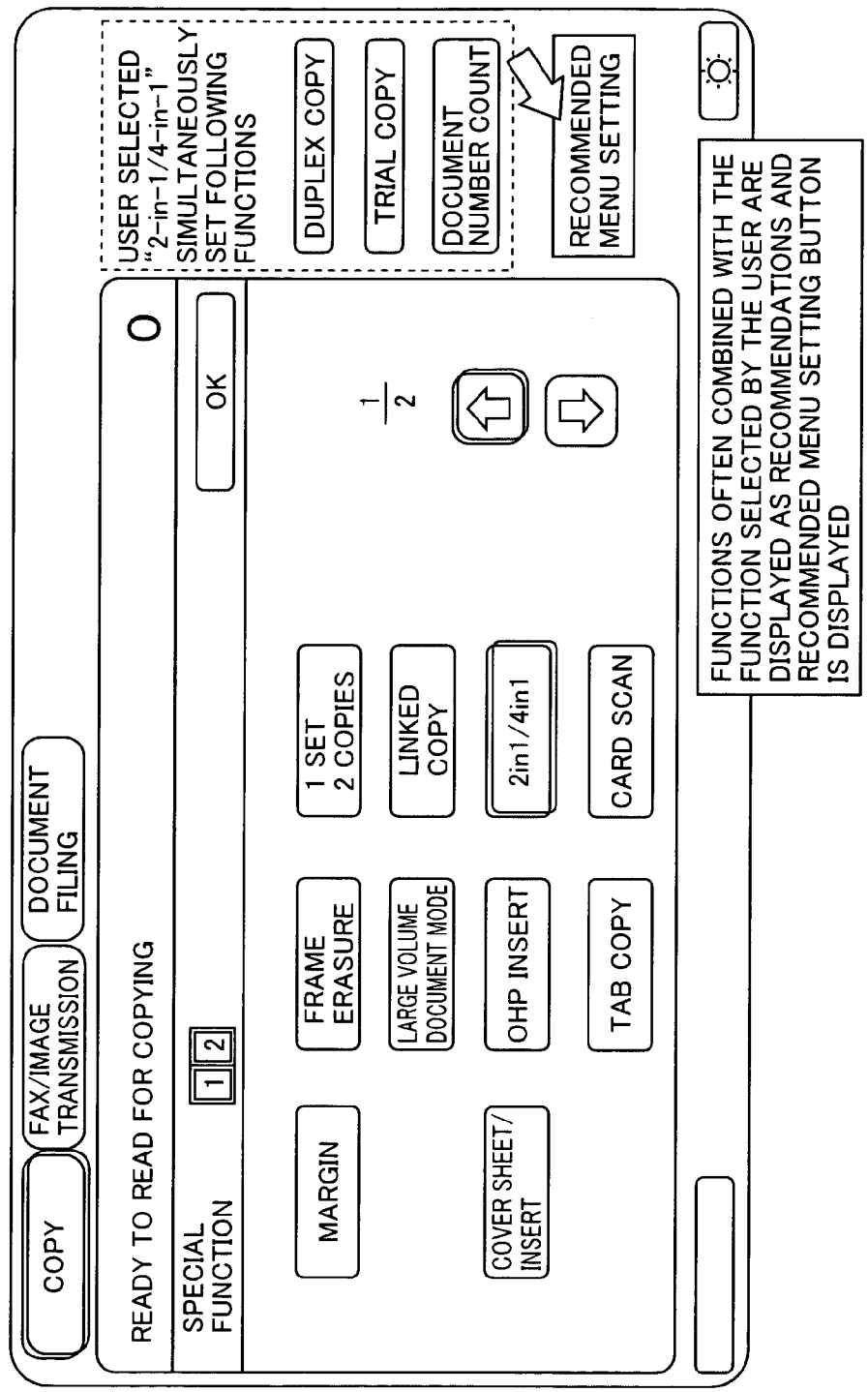
FIGS. 16 to 19 are transition diagrams showing exemplary displays on a touch-panel display when the program of FIG. 11 is executed.

Further, in the present embodiment, the recommended menu setting button is displayed on touch-panel display 380 as shown in FIG. 16. Specifically, a function that is often combined with the function selected by the user is displayed as a recommendation, and the recommended menu setting button is displayed (S3222, S3224).

Figure 17:
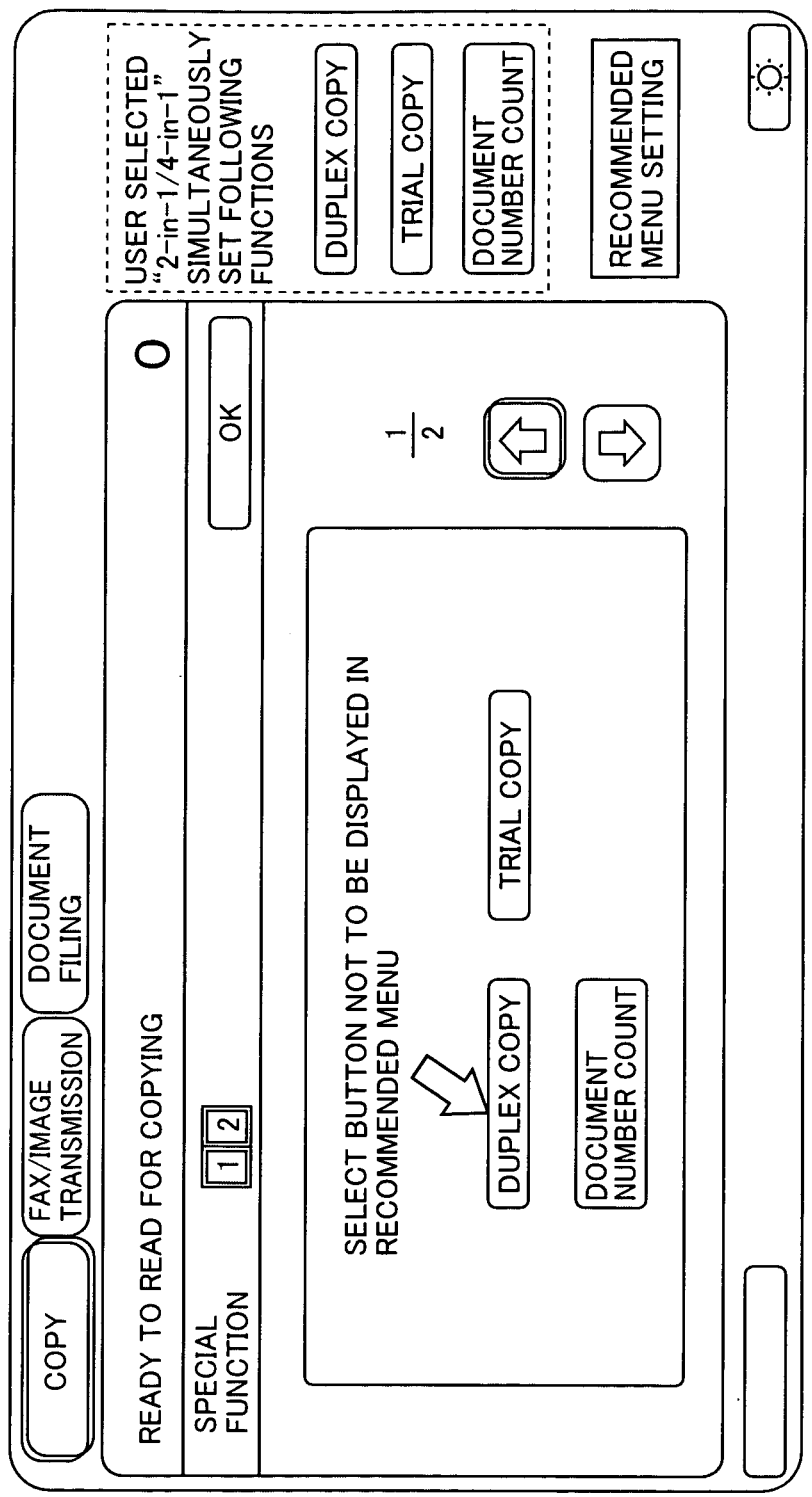

Assume that the user does not wish to have at least one of the three functions "duplex copy", "trial copy" and "count document number" displayed on touch-panel display 380. Then, the user presses the recommended menu setting button (YES at S3226). If the recommended menu setting button is pressed, an image for selecting a function to be deleted from the recommended menu is displayed as shown in FIG. 17 (S3228). As shown in FIG. 17, three buttons corresponding to the recommended functions shown in FIG. 16 ("duplex copy", "trial copy" and "count document number") are displayed.

If the "duplex copy" function is not to be displayed on touch-panel display 380, the button corresponding to "duplex copy" is pressed on the image of FIG. 17. If the button corresponding to "duplex copy" is pressed (YES at S3230), an image confirming that "duplex copy" is not to be displayed in the recommended menu is displayed (S3232).

Figure 18:
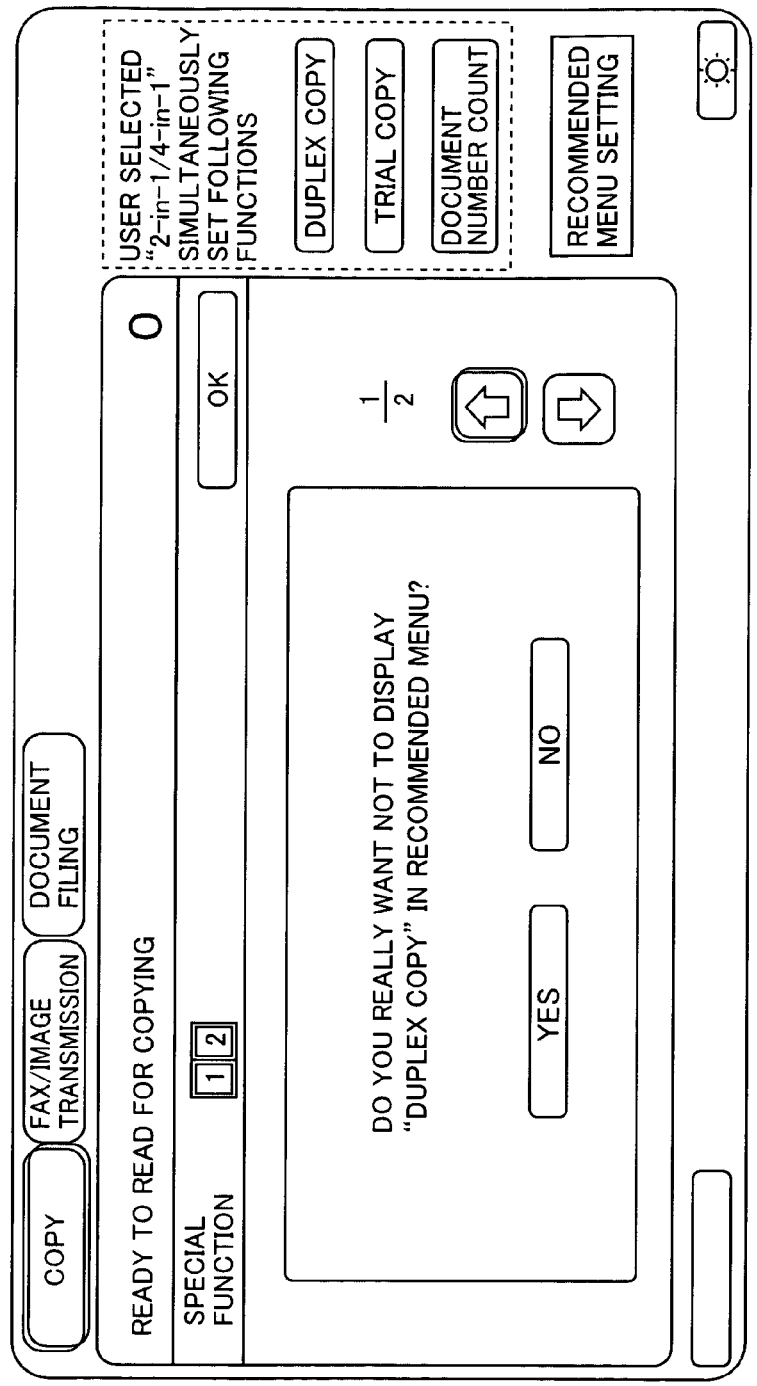
Figure 19:
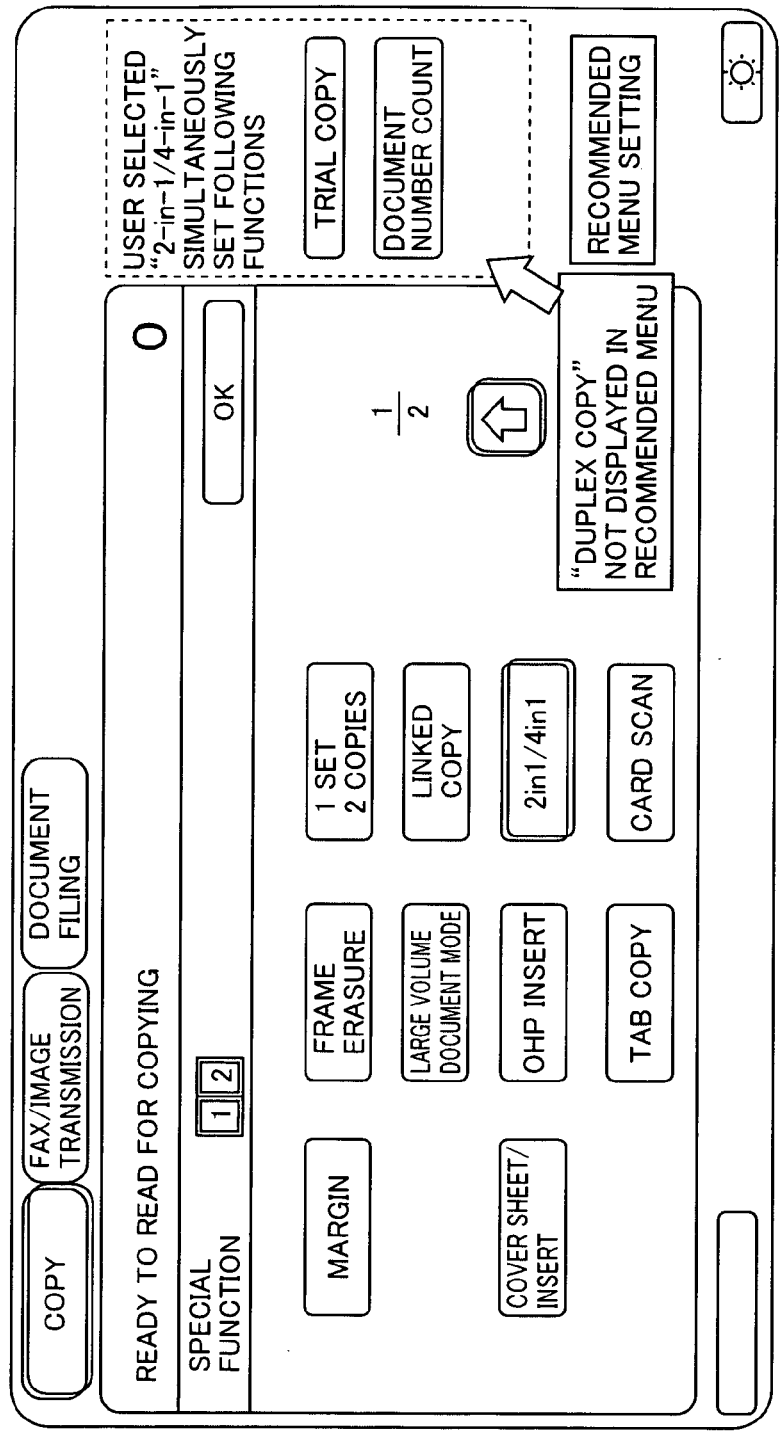

To confirm that the "duplex copy" function is not to be displayed as the recommended function on touch-panel display 380, a button corresponding to "YES" is pressed on the image shown in FIG. 18 (YES at S3234). If the button corresponding to "YES" is pressed, display of "duplex copy" as the recommended function disappears, as shown in FIG. 19. Here, the "duplex copy" function selected not to be displayed is stored in the not-to-be-displayed function management table as the not-to-be-displayed recommended function, in association with the user ID (S3236). When the job is completed (YES at S3204), the not-to-be-displayed recommended function information and the user ID are transmitted to server computer 200 based on the not-to-be-displayed function management table, since it is possible that the user has input a request not to display a recommended function. It is preferred that the not-to-be-displayed recommended function information is transmitted to server computer 200 only when a request not to display has been input.

Receiving the not-to-be-displayed recommended function information from MFP 300 (YES at S2200), server computer 200 stores the received not-to-be-displayed recommended function information in the not-to-be-displayed function management table (FIG. 7) in HDD 240, together with the user ID. If the time is reached for server computer 200 to transmit the not-to-be-displayed recommended function information based on the not-to-be-displayed function management table to each MFP 300 (YES at S2204), the user-by-user not-to-be-displayed recommended function (recommended function not-to-be-displayed) is transmitted to MFP 300 based on the not-to-be-displayed function management table (S2206).

Receiving the user-by-user not-to-be-displayed recommended function from server computer 200 (YES at S3210), MFP 300 stores the received user-by-user not-to-be-displayed recommended function in the not-to-be-displayed function management table (FIG. 7) in HDD 340, together with the user ID. As a result, a function requested not to be displayed by the user on any of the plurality of MFPs 300 comes to be not displayed as the recommended function on any other MFP 300, without requiring the not-to-display setting in other MFPs.

As described above, in the network image forming system in accordance with the present embodiment, the function often used recently by the logged-in user is displayed and, when the user selects one function from various functions of the multi-function peripheral, a function or functions used in combination with the selected function by a user in the past (here, the user is the logged-in user himself/herself or other users) are displayed as recommended functions. Therefore, it is possible for the logged-in user to easily select the function he/she often uses recently. Further, different from the conventional art, a function that is often used by others in combination with the function the logged-in user selected is displayed. By such a display, it becomes possible to efficiently know an effective combination of functions of the multi-function peripheral that is not known to the user but used by other users. A user who does not like display of a function often used in combination by others can avoid such a display. Therefore, annoyance to the user can be avoided, and display of wasteful information is prevented. When the function of server computer is implemented by one of the plurality of multi-function peripherals, such an effect can be realized without necessitating a server computer. Further, such a function can be realized simply by a multi-function peripheral having the function of a server computer, without necessitating a plurality of multi-function peripherals.

In the present embodiment, the function combination management table shown in FIG. 5 is maintained as it is, and the calculated "display priority" is not changed, the collected "number of combinations" is not reduced, and the collected "combined functions" is not deleted. In the not-to-be-displayed function management table shown in FIG. 7, if there is a request not-to-display, the not-to-be-displayed recommended function is stored in correspondence to the user ID. Therefore, if the user requests display of the function again, what is necessary is simply to delete the function of which display is requested, from the not-to-be-displayed function management table. By such an approach, it is possible to easily and continuously reflect the function combination management table of which contents are accumulated on real-time basis, and in addition, to easily meet the demand for displaying again.

It is also possible to have the function often used by the user and the function or functions often combined with the function displayed on touch-panel display 380, before the user who logged-in to use the MFP selects any function. Specifically, the function often used recently by the logged-in user and the function or functions often used in combination with the often used function are displayed. In this case also, the function set not-to-be-displayed is not displayed.

Further, it is also possible to display the recommended function with lower display priority on touch-panel display 380, rather than not displaying the function at all.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An image forming apparatus displaying information related to a function combined with a function selected by a user from a plurality of functions of the image forming apparatus, comprising:
   an obtaining unit obtaining use history information related to the function selected by the user;
   a use history storage unit storing said use history information;
   a collecting unit collecting combination information related to frequency of combination between one function and another function, based on the stored use history information;
   a combination information storage unit for storing said combination information;
   a first selecting unit allowing the user to select one function from a plurality of functions;
   a display unit displaying a function combined with high frequency with said selected function based on said combination information;
   a second selecting unit allowing a user to select one or more functions that are not to be displayed on said display unit; and
   a control unit controlling said display unit such that a function or functions combined with high frequency are displayed, and excluding said one or more functions that are not to be displayed.

2. The image forming apparatus according to claim 1, wherein said display unit displays functions that are combined with high frequency in order, starting from a function of the highest frequency.

3. An image forming apparatus displaying information related to a function combined with a function selected by a user from a plurality of functions of the image forming apparatus, comprising:
   an obtaining unit obtaining combination information, from an information processing apparatus obtaining use history information related to a function selected by the user and collecting combination information related to frequency of combination between one function and another function;
   a combination information storage unit for storing said combination information;
   a first selecting unit allowing the user to select one function from a plurality of functions;
   a display unit displaying a function combined with high frequency with said selected function based on said combination information;
   a second selecting unit allowing a user to select one or more functions that are not to be displayed on said display unit; and
   a control unit controlling said display unit such that a function or functions combined with high frequency are displayed, and excluding said one or more functions that are not to be displayed not-to-be-displayed function.

4. The image forming apparatus according to claim 3, wherein said display unit displays functions that are combined with high frequency in order, starting from a function of the highest frequency.

* * * * *